United States Patent
Yang et al.

(10) Patent No.: US 11,262,606 B2
(45) Date of Patent: Mar. 1, 2022

(54) NONRECIPROCAL OPTICAL TRANSMISSION DEVICE AND OPTICAL APPARATUS INCLUDING THE SAME

(71) Applicants: SAMSUNG ELECTRONICS CO., LTD., Suwon-si (KR); IUCF-HYU (INDUSTRY-UNIVERSITY COOPERATION FOUNDATION HANYANG UNIVERSITY), Seoul (KR)

(72) Inventors: Kiyeon Yang, Seongnam-si (KR); Youngsun Choi, Seoul (KR); Seokho Song, Seoul (KR); Jaewoong Yoon, Seoul (KR); Choloong Han, Seoul (KR); Yongsung Kim, Suwon-si (KR); Jeongyub Lee, Yongin-si (KR); Changseung Lee, Yongin-si (KR)

(73) Assignees: SAMSUNG ELECTRONICS CO., LTD., Suwon-si (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 2 days.

(21) Appl. No.: 16/857,756

(22) Filed: Apr. 24, 2020

(65) Prior Publication Data

US 2020/0257142 A1 Aug. 13, 2020

Related U.S. Application Data

(62) Division of application No. 15/632,640, filed on Jun. 26, 2017, now Pat. No. 10,670,891.

(30) Foreign Application Priority Data

Dec. 30, 2016 (KR) .................. 10-2016-0184358

(51) Int. Cl.
*G02B 6/26* (2006.01)
*G02B 6/12* (2006.01)
(Continued)

(52) U.S. Cl.
CPC ............. *G02F 1/093* (2013.01); *G02B 1/046* (2013.01); *G02B 6/12007* (2013.01); *G02B 6/26* (2013.01);
(Continued)

(58) Field of Classification Search
None
See application file for complete search history.

(56) References Cited

U.S. PATENT DOCUMENTS

| 5,905,823 A | 5/1999 | Shintaku et al. |
| 6,438,280 B1 | 8/2002 | Gampp et al. |

(Continued)

FOREIGN PATENT DOCUMENTS

| CN | 1184945 A | 6/1998 |
| CN | 1828349 A | 9/2006 |

(Continued)

OTHER PUBLICATIONS

Communication dated Apr. 23, 2018, from the European Patent Office in counterpart European Application No. 17183390.8.
(Continued)

*Primary Examiner* — Derek S. Chapel
(74) *Attorney, Agent, or Firm* — Sughrue Mion, PLLC

(57) ABSTRACT

Nonreciprocal optical transmission devices and optical apparatuses including the nonreciprocal optical transmission devices are provided. A nonreciprocal optical transmission device includes an optical input portion, an optical output portion, and an intermediate connecting portion interposed between the optical input portion and the optical output portion, and comprising optical waveguides. A complex
(Continued)

refractive index of any one or any combination of the optical waveguides changes between the optical input portion and the optical output portion, and a transmission direction of light through the nonreciprocal optical transmission device is controlled by a change in the complex refractive index.

19 Claims, 21 Drawing Sheets

(51) Int. Cl.
*G02B 1/04* (2006.01)
*G02B 6/27* (2006.01)
*G02F 1/09* (2006.01)
*G02B 6/293* (2006.01)
*G02B 6/42* (2006.01)
*G02F 1/095* (2006.01)
*G02F 1/31* (2006.01)

(52) U.S. Cl.
CPC ......... *G02B 6/2746* (2013.01); *G02B 6/2935* (2013.01); *G02B 6/4209* (2013.01); *G02F 1/0955* (2013.01); *G02F 1/31* (2013.01); *G02B 2006/12157* (2013.01); *G02F 2203/04* (2013.01); *G02F 2203/06* (2013.01)

(56) References Cited

U.S. PATENT DOCUMENTS

| | | | |
|---|---|---|---|
| 6,453,086 | B1* | 9/2002 | Tarazona ............... G02F 1/0134 385/20 |
| 6,943,932 | B2 | 9/2005 | Fujita et al. |
| 7,065,265 | B2 | 6/2006 | Hammer |
| 7,260,281 | B2 | 8/2007 | Salib et al. |
| 7,310,468 | B2 | 12/2007 | Kittaka et al. |
| 7,397,977 | B2 | 7/2008 | Hashimoto et al. |
| 7,912,325 | B2 | 3/2011 | Sugamata et al. |
| 8,358,891 | B2 | 1/2013 | Shimizu et al. |
| 10,670,891 | B2* | 6/2020 | Yang .................... G02F 1/0955 |
| 2004/0081398 | A1 | 4/2004 | Jette et al. |
| 2011/0194803 | A1 | 8/2011 | Shin et al. |
| 2011/0235971 | A1 | 9/2011 | Hashimoto |
| 2013/0216220 | A1 | 8/2013 | Yamanaka |

FOREIGN PATENT DOCUMENTS

| | | |
|---|---|---|
| CN | 103472536 A | 12/2013 |
| CN | 104977733 A | 10/2015 |
| EP | 0952472 A2 | 10/1999 |
| JP | 10-68910 A | 3/1998 |
| KR | 10-0580658 B1 | 5/2006 |
| KR | 10-2016-0082006 A | 7/2016 |
| WO | 2009081488 A1 | 7/2009 |

OTHER PUBLICATIONS

Doppler, J., et al., "Dynamically encircling an exceptional point for asymmetric mode switching", Sep. 1, 2016, Nature, vol. 537, 6 pages total.

Hugo Lira et al; "Electrically Driven Nonreciprocity Induced by Interband Photonic Transition on a Silicon Chip"; Physical Review Letters; Jul. 20, 2012; pp. 033901-1-033901-5; 5 pgs. total.

Lei Bi et al; "On-Chip optical isolation in monolithically integrated non-reciprocal optical resonators" Nature Photonics; vol. 5; Dec. 2011; pp. 758-762; 5 pgs. total.

Li Fan et al; "An All-Silicon Passive Optical Diode"; Science; vol. 335; Jan. 27, 2012; pp. 447-449; 7 pgs. total.

Uzdin, R., et al., "On the observability and asymmetry of adiabatic state flips generated by exceptional points", Oct. 5, 2011, Journal of Physics A: Mathematical and Theoretical, vol. 44, 9 pages total.

Yi Yu et al; "Nonreciprocal transmission in a nonlinear photonic-crystal Fano structure with broken symmetry"; Laser & Photonics Review; vol. 9, No. 2; 2015; pp. 241-247; 7 pgs. total.

Yong Zhang et al; "Silicon Optical Diode based on cascaded photonic crystal cavities"; Optics Letters; vol. 39; No. 6; Mar. 15, 2014; pp. 1370-1373; 4 pgs. total.

Zongfu Yu et al; "Complete optical isolation created by indirect interband photonic transitions"; Nature Photonics; vol. 3; Feb. 2009; pp. 91-94; 5 pgs. total.

Communication dated Apr. 24, 2020, from the State Intellectual Property Office of People's Republic of China in counterpart Application No. 201711283653.5.

* cited by examiner

NONRECIPROCAL OPTICAL TRANSMISSION DEVICE AND OPTICAL APPARATUS INCLUDING THE SAME

CROSS-REFERENCE TO RELATED APPLICATION

This application is a divisional of U.S. application Ser. No. 15/632,640 filed Jun. 26, 2017, which claims priority from Korean Patent Application No. 10-2016-0184358, filed on Dec. 30, 2016, in the Korean Intellectual Property Office, the disclosure of which is incorporated herein by reference in its entirety.

BACKGROUND

1. Field

Apparatuses and methods consistent with example embodiments relate to an optical device and an optical apparatus, and more particularly, to a nonreciprocal optical transmission device and an optical apparatus including the same.

2. Description of the Related Art

Because a signal transmission waveguide substantially supports bidirectional optical transmission equally, subsequent optical signal processing procedures, e.g., signal modulation, wavelength and polarization filtering, logical operations, signal amplification, etc., are inevitably followed by generation of an inverse optical signal. If the inverse optical signal is delivered to a light source, for example, a resulting secondary effect is generated, causing instability of wavelength and light intensity and also an uncontrollable amount of noise. Thus, an optical device for isolating (separating) the inverse optical signal is needed.

Isolation of the inverse optical signal may be needed for stable operations of any optical device based on a non-linear effect as well as apparatuses using a laser light source. There are various optical devices based on the non-linear effect, such as an optical logical operation device, a wavelength conversion device, an optical amplifier, an optical buffer, a high-order harmonic generation device, and so forth, and optical devices based on the non-linear effect may be elements for optical signal processing.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide nonreciprocal optical transmission devices of an optical waveguide type.

Example embodiments provide nonreciprocal optical transmission devices using change in a complex index of refraction (or a complex refractive index).

Example embodiments provide nonreciprocal optical transmission devices of a chip-integration type.

Example embodiments provide nonreciprocal optical transmission devices having a wide transmission bandwidth.

Example embodiments provide nonreciprocal optical transmission devices having a high nonreciprocal transmission ratio and a high forward transmission efficiency.

Example embodiments provide optical apparatuses (e.g., a light detection and ranging (LiDAR) apparatus, a mobile health care device, etc.) including the nonreciprocal optical transmission devices.

According to an aspect of an example embodiment, there is provided a nonreciprocal optical transmission device including an optical input portion, an optical output portion, and an intermediate connecting portion interposed between the optical input portion and the optical output portion, and including optical waveguides. A complex refractive index of any one or any combination of the optical waveguides changes between the optical input portion and the optical output portion, and a transmission direction of light through the nonreciprocal optical transmission device is controlled by a change in the complex refractive index.

A change profile of the complex refractive index in a direction from the optical input portion to the optical output portion and a change profile of the complex refractive index in a direction from the optical output portion to the optical input portion may be asymmetric with respect to a center of the intermediate connecting portion.

The optical waveguides may include a first optical waveguide and a second optical waveguide, and a difference between a change amount ($\Delta n_1'$) of a real part of a complex refractive index of the first optical waveguide and a change amount ($\Delta n_2'$) of a real part of a complex refractive index of the second optical waveguide may increase and then decrease in a direction from the optical input portion to the optical output portion, and decrease and then increase in a direction from the optical output portion to the optical input portion.

A difference between a change amount ($\Delta n_1''$) of an imaginary part of the complex refractive index of the first optical waveguide and a change amount ($\Delta n_2''$) of an imaginary part of the complex refractive index of the second optical waveguide may increase and then decrease in the direction from the optical input portion to the optical output portion.

The optical waveguides may include a first optical waveguide and a second optical waveguide, and a difference between a change amount ($\Delta n_1''$) of an imaginary part of a complex refractive index of the first optical waveguide and a change amount ($\Delta n_2''$) of an imaginary part of a complex refractive index of the second optical waveguide may increase and then decrease in a direction from the optical input portion to the optical output portion.

Either one or both of a width and a thickness of any one or any combination of the optical waveguides may change in a direction from the optical input portion to the optical output portion.

Either one or both of a width and a thickness of one of the optical waveguides may increase and then decrease in the direction from the optical input portion to the optical output portion, and decrease and then increase in a direction from the optical output portion to the optical input portion.

Either one or both of a width and a thickness of one of the optical waveguides may decrease and then increase in the direction from the optical input portion to the optical output portion, and increase and then decrease in a direction from the optical output portion to the optical input portion.

The nonreciprocal optical transmission device may further include a side patch disposed on a side of the intermediate connecting portion and to a side of an optical waveguide among the optical waveguides, and a distance between the side patch and the optical waveguide may change in a direction from the optical input portion to the optical output portion.

The distance between the side patch and the optical waveguide may decrease and then increase in the direction from the optical input portion to the optical output portion.

The distance between the side patch and the optical waveguide may increase and then decrease in the direction from the optical input portion to the optical output portion.

The nonreciprocal optical transmission device may further include a side patch disposed on a side of the intermediate connecting portion and to a side of an optical waveguide among the optical waveguides, a distance between the side patch and the optical waveguide may change in a direction from the optical input portion to the optical output portion, and either one or both of a width and a thickness of any one or any combination of the optical waveguides may change in the direction from the optical input portion to the optical output portion.

Either one or both of the optical input portion and the optical output portion may have a Y-branch structure.

A part of the optical input portion, the optical output portion, and the intermediate connecting portion may include any one or any combination of a semiconductor, a polymer, a dielectric, and a metal.

An optical apparatus may include the nonreciprocal optical transmission device, a first optical element configured to input light into the optical input portion of the nonreciprocal optical transmission device, and a second optical element configured to receive light output from the optical output portion of the nonreciprocal optical transmission device.

Any combination of the nonreciprocal optical transmission device, the first optical element, and the second optical element may be disposed on a chip.

The optical apparatus may be a light detection and ranging apparatus.

The optical apparatus may be a health care apparatus.

According to an aspect of an example embodiment, there is provided a nonreciprocal optical transmission device including an optical input portion, an optical output portion, and an intermediate connecting portion interposed between the optical input portion and the optical output portion, and including optical waveguides. Either one or both of a width and a thickness of any one or any combination of the optical waveguides changes in a direction from the optical input portion to the optical output portion.

A complex refractive index of any one or any combination of the optical waveguides may change between the optical input portion and the optical output portion.

The optical waveguides may include a first optical waveguide and a second optical waveguide, and a difference between a change amount ($\Delta n_1'$) of a real part of a complex refractive index of the first optical waveguide and a change amount ($\Delta n_2'$) of a real part of a complex refractive index of the second optical waveguide may increase and then decrease in the direction from the optical input portion to the optical output portion, and decrease and then increase in a direction from the optical output portion to the optical input portion.

The optical waveguides may include a first optical waveguide and a second optical waveguide, and a difference between a change amount ($\Delta n_1''$) of an imaginary part of a complex refractive index of the first optical waveguide and a change amount ($\Delta n_2''$) of an imaginary part of a complex refractive index of the second optical waveguide may increase and then decrease in the direction from the optical input portion to the optical output portion.

Either one or both of a width and a thickness of one of the optical waveguides may increase and then decrease in the direction from the optical input portion to the optical output portion, and decreases and then increases in a direction from the optical output portion to the optical input portion, or decrease and then increase in the direction from the optical input portion to the optical output portion, and increases and then decreases in the direction from the optical output portion to the optical input portion.

The nonreciprocal optical transmission device may further include a side patch disposed on a side of the intermediate connecting portion and to a side of an optical waveguide among the optical waveguides, and a distance between the side patch and the optical waveguide may decrease and then increase in the direction from the optical input portion to the optical output portion, or increase and then decrease in the direction from the optical input portion to the optical output portion.

An optical apparatus may include a nonreciprocal optical transmission device, a first optical element configured to input light into the optical input portion of the nonreciprocal optical transmission device, and a second optical element configured to receive light output from the optical output portion of the nonreciprocal optical transmission device.

According to an aspect of an example embodiment, there is provided a method of manufacturing a nonreciprocal optical transmission device, the method including forming an insulating layer on a substrate, forming a semiconductor layer on the insulating layer, and patterning the semiconductor layer to form a first optical waveguide, a side patch, and a second optical waveguide between the first optical waveguide and the side patch. A complex refractive index of either one or both of the first optical waveguide and the second optical waveguide changes between a first end and a second end of a respective one of the first optical waveguide and the second optical waveguide.

The patterning may include patterning the semiconductor layer to form either one or both of the first optical waveguide and the second optical waveguide having either one or both of a width and a thickness that changes between the first end and the second end.

The patterning may include patterning the semiconductor layer to form the side patch having a distance from the second optical waveguide that changes between a first end and a second end of the side patch.

The method may further include forming a cladding layer on the first optical waveguide, the side patch, and the second optical waveguide, bonding the cladding layer to another substrate, and removing the substrate after cladding layer is bonded to the other substrate.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
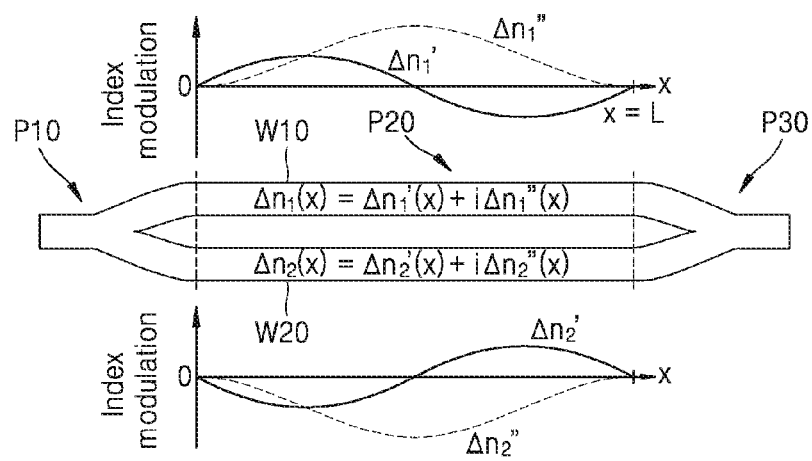
FIG. 1 is a plan view of a nonreciprocal optical transmission device according to an example embodiment.

Example embodiments will now be described more fully with reference to the accompanying drawings in which the example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first," "second," etc. may be used herein to describe various elements, components, regions, layers and/or sections, these elements, components, regions, layers and/or sections may not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing the example embodiments only and is not intended to be limiting of the example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The example embodiments are described herein with reference to cross-sectional illustrations that are schematic illustrations of idealized examples (and intermediate structures) of the example embodiments. As such, variations from the shapes of the illustrations as a result, for example, of manufacturing techniques and/or tolerances, are to be expected. Thus, the example embodiments may not be construed as limited to the particular shapes of regions illustrated herein but are to include deviations in shapes that result, for example, from manufacturing. For example, an implanted region illustrated as a rectangle will have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, and their shapes are not intended to illustrate the actual shape of a region of a device and are not intended to limit the scope of the example embodiments.

Unless otherwise defined, all terms (including technical and scientific terms) used herein have the same meaning as commonly understood by one of ordinary skill in the art to which the example embodiments belong. It will be further understood that terms, such as those defined in commonly-used dictionaries, may be interpreted as having a meaning that is consistent with their meaning in the context of the relevant art and will not be interpreted in an idealized or overly formal sense unless expressly so defined herein.

Hereinafter, nonreciprocal optical transmission devices and optical apparatuses including the same according to example embodiments will be described in detail with reference to the attached drawings. The width and thickness of layers or regions illustrated in the accompanying drawings may be exaggerated for clarity of the specification and the convenience of explanation. Throughout the detailed description, identical reference numerals refer to identical elements.

FIG. 1 is a plan view of a nonreciprocal optical transmission device according to an example embodiment.

Referring to FIG. 1, a nonreciprocal optical transmission device according to an example embodiment may be an optical waveguide type device. The nonreciprocal optical transmission device may include an optical input portion P10 and an optical output portion P30. The input portion P10 may be an input terminal, and the output portion P30 may be an output terminal. The nonreciprocal optical transmission device may include an intermediate connecting portion P20 between the input portion P10 and the output portion P30. The intermediate connecting portion P20 may include optical waveguides, for example, first and second optical waveguides W10 and W20. For example, the intermediate connecting portion P20 may include the first optical waveguide W10 and the second optical waveguide W20. As such, if the intermediate connecting portion P20 includes the two optical waveguides W10 and W20, either one or both of the input portion P10 and the output portion P30 may have a Y-branch structure. Herein, both the input portion P10 and the output portion P30 are illustrated as having the Y-branch structure.

A complex index of refraction (or a complex refractive index) of any one or any combination of the optical waveguides W10 and W20 included in the intermediate connecting portion P20 may change between the input portion P10 and the output portion P30. Due to a change in the complex refractive index, the transmission direction of light through the nonreciprocal optical transmission device according to an example embodiment may be controlled. In this regard, a change profile of the complex refractive index in a direction from the input portion P10 to the output portion P30 and a change profile of the complex refractive index in a direction from the output portion P30 to the input portion P10 may be asymmetric or nonsymmetric with respect to the center of the intermediate connecting portion P20.

A graph related to a change in the complex refractive index of the first optical waveguide W10 is shown above the intermediate connecting portion P20 of FIG. 1, and a graph related to a change in the complex refractive index of the second optical waveguide W20 is shown under the intermediate connecting portion P20. In FIG. 1, a complex refractive index of each of the first optical waveguide W10 and the second optical waveguide W20 changes between the input portion P10 and the output portion P30.

A change $\Delta n_1$ of the complex refractive index in a longitudinal direction of the first optical waveguide W10 is expressed by $\Delta n_1(x) = \Delta n_1'(x) + i\Delta n_1''(x)$. Herein, $\Delta n_1'$ indicates a change amount of a real part of the complex refractive index of the first optical waveguide W10, and $\Delta n_1''$ indicates a change amount of an imaginary part of the complex refractive index of the first optical waveguide W10. A change amount $\Delta n_2$ of the complex refractive index in a longitudinal direction of the second optical waveguide W20 is expressed by $\Delta n_2(x) = \Delta n_2'(x) + i\Delta n_2''(x)$. Herein, $\Delta n_2'$ indicates a change amount of a real part of the complex refractive index of the second optical waveguide W20, and $\Delta n_2''$ indicates a change amount of an imaginary part of the complex refractive index of the second optical waveguide W20. The real part is related to substantial refraction of light, and the imaginary part is related to absorption of light and energy loss.

From the graph shown above the intermediate connecting portion P20, a change tendency of $\Delta n_1'$ and $\Delta n_1''$ may be seen. $\Delta n_1'$ may be a first-order differential value indicating a change amount of $n_1'$, and a change amount of $\Delta n_1'$ may be a second-order differential value. $\Delta n_1''$ may be a first-order differential value indicating a change amount of $n_1''$, and a change amount of $\Delta n_1''$ may be a second-order differential value. The same is also applied to $\Delta n_2'$ and $\Delta n_2''$ shown in the graph shown under the intermediate connecting portion P20. From the graph, a change tendency of $\Delta n_2'$ and $\Delta n_2''$ may be seen.

Comparing the two graphs shown above and under the intermediate connecting portion P20, a difference between the change amount $\Delta n_1'$ of the real part of the complex refractive index of the first optical waveguide W10 and the change amount $\Delta n_2'$ of the real part of the complex refractive index of the second optical waveguide W20, that is, $\Delta n_1' - \Delta n_2'$, may increase and then decrease in a direction from the input portion P10 to the output portion P30 and may decrease and then increase in a direction from the output portion P30 to the input portion P10. The real part change amount difference, that is, $\Delta n_1' - \Delta n_2'$, may increase and then decrease, and again increase in the direction from the input portion P10 to the output portion P30, and may decrease and then increase, and again decrease in the direction from the output portion P30 to the input portion P10. The change graph of $\Delta n_1'$ may have an inflection point in or near the center of the intermediate connecting portion P20, and the change graph of $\Delta n_2'$ may have an inflection point in or near the center of the intermediate connecting portion P20.

A difference between the change amount $\Delta n_1''$ of the imaginary part of the complex refractive index of the first optical waveguide W10 and the change amount $\Delta n_1'$ of the imaginary part of the complex refractive index of the second optical waveguide W20, that is, $\Delta n_1'' - \Delta n_2''$, may increase and then decrease in the direction from the input portion P10 to the output portion P30. The imaginary part change amount difference, that is, $\Delta n_1'' - \Delta n_2''$, may increase and then decrease in the direction from the output portion P30 to the input portion P10. The change graph of $\Delta n_1''$ and the change graph of $\Delta n_2''$ may have a peak point in or near the center of the intermediate connecting portion P20.

A change profile of the complex refractive index of the first optical waveguide W10 in the direction from the input portion P10 to the output portion P30 and a change profile of the complex refractive index of the first optical waveguide W10 in the direction from the output portion P30 to the input portion P10 may be asymmetric or nonsymmetric with respect to the center of the intermediate connecting portion P20. A change profile of the complex refractive index of the second optical waveguide W20 in the direction from the input portion P10 to the output portion P30 and a change profile of the complex refractive index of the second optical waveguide W20 in the direction from the output portion P30 to the input portion P10 may be asymmetric or nonsymmetric with respect to the center of the intermediate connecting portion P20.

In regard to a change in the complex refractive index of the intermediate connecting portion P20, the transmission direction of light through the nonreciprocal optical transmission device according to an example embodiment may be controlled (determined). That is, light may be transmitted/propagated from the input portion P10 to the output portion P30 and may not be substantially transmitted/propagated from the output portion P30 to the input portion P10. This will be described later in more detail with reference to FIGS. 9 and 10.

While the changes of $\Delta n_1'$, $\Delta n_1''$, $\Delta n_2'$, and $\Delta n_2''$ are shown in FIG. 1, the graphs indicating the changes of $\Delta n_1'$, $\Delta n_1''$, $\Delta n_2'$, and $\Delta n_2''$ may vary. Such examples are shown in FIGS. 2 through 7.

Figure 2:
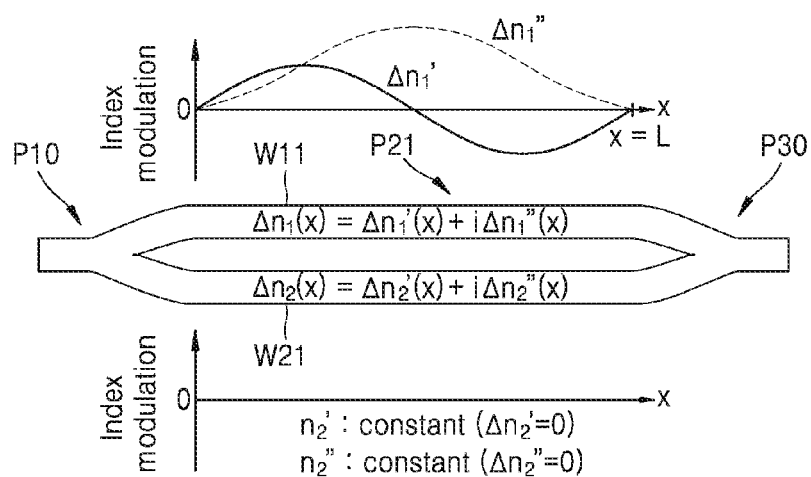
FIG. 2 is a plan view of a nonreciprocal optical transmission device according to another example embodiment.

FIG. 2 is a plan view of a nonreciprocal optical transmission device according to another example embodiment.

Referring to FIG. 2, an intermediate connecting portion P21 may include a first optical waveguide W11 and a second optical waveguide W21. The change amount $\Delta n_1'$ of the real part of the complex refractive index of the first optical waveguide W11 and the change amount $\Delta n_1''$ of the imaginary part of the complex refractive index of the first optical waveguide W11 may change as shown in an upper graph. A real part $n_2'$ and an imaginary part $n_2''$ of the complex refractive index of the second optical waveguide W21 may be maintained constant as shown in a lower graph. Thus, $\Delta n_1$ and $\Delta n_2''$ may be maintained as 0. In other words, the complex refractive index of the first optical waveguide W11 may change without change in the complex refractive index of the second optical waveguide W21.

In this case, a change range of each of the change amount $\Delta n_1'$ of the real part of the complex refractive index of the first optical waveguide W11 and the change amount $\Delta n_1''$ of the imaginary part of the complex refractive index of the first optical waveguide W11 may be greater than a change range of the change amount $\Delta n_1'$ of the real part of the complex refractive index of the first optical waveguide W10 and the change amount $\Delta n_1''$ of the imaginary part of the complex refractive index of the first optical waveguide W10 in FIG. 1. For example, the change range of each of the change amount $\Delta n_1'$ of the real part of the complex refractive index of the first optical waveguide W11 and the change amount $\Delta n1''$ of the imaginary part of the complex refractive index of the first optical waveguide W11 may be about twice greater than the change range of the change amount $\Delta n1'$ of the real part of the complex refractive index of the first optical waveguide W10 and the change amount $\Delta n1''$ of the imaginary part of the complex refractive index of the first optical waveguide W10 in FIG. 1.

In the example embodiment of FIG. 2, a difference between the change amount $\Delta n_1'$ of the real part of the complex refractive index of the first optical waveguide W11 and the change amount $\Delta n_2'$ of the real part of the complex refractive index of the second optical waveguide W21, that is, $\Delta n_1' - \Delta n_2'$, may increase and then decrease in the direction from the input portion P10 to the output portion P30 and may decrease and then increase in the direction from the output portion P30 to the input portion P10. A difference between the change amount $\Delta n_1''$ of the imaginary part of the complex refractive index of the first optical waveguide W11 and the change amount $\Delta n_2''$ of the imaginary part of the complex refractive index of the second optical waveguide W21, that is, $\Delta n_1'' - \Delta n_2''$, may increase and then decrease in the direction from the input portion P10 to the output portion P30. Thus, the nonreciprocal optical transmission device of FIG. 2 may have optical characteristics that are similar with those of the nonreciprocal optical transmission device of FIG. 1.

Figure 3:
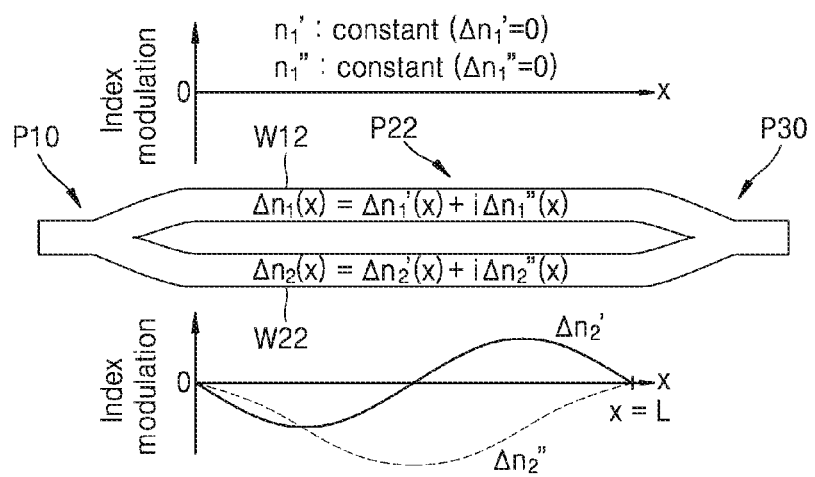
FIG. 3 is a plan view of a nonreciprocal optical transmission device according to another example embodiment.

FIG. 3 is a plan view of a nonreciprocal optical transmission device according to another example embodiment.

In FIG. 3, the complex refractive index of a first optical waveguide W12 does not change and the complex refractive index of a second optical waveguide W22 changes, in an intermediate connecting portion P22. In this case, a change range of each of the change amount $\Delta n_2'$ of the real part of the complex refractive index of the second optical waveguide W22 and the change amount $\Delta n_2''$ of the imaginary part of the complex refractive index of the second optical waveguide W22 may be, for example, twice greater than a change range of the change amount $\Delta n_2'$ of the real part of the complex refractive index of the second optical waveguide W20 and the change amount $\Delta n_1''$ of the imaginary part of the complex refractive index of the second optical waveguide W20 in FIG. 1. In the example embodiment of FIG. 3, a difference between the change amount $\Delta n_1'$ of the real part of the complex refractive index of the first optical waveguide W12 and the change amount $\Delta n_2'$ of the real part of the complex refractive index of the second optical waveguide W22, that is, $\Delta n_1' - \Delta n_2'$, may increase and then decrease in the direction from the input portion P10 to the output portion P30 and may decrease and then increase in the direction from the output portion P30 to the input portion P10. A difference between the change amount $\Delta n_1''$ of the imaginary part of the complex refractive index of the first optical waveguide W12 and the change amount $\Delta n_2''$ of the imaginary part of the complex refractive index of the second optical waveguide W22, that is, $\Delta n_1'' - \Delta n_2''$, may increase and then decrease in the direction from the input portion P10 to the output portion P30. Thus, the nonreciprocal optical transmission device of FIG. 3 may have optical characteristics that are similar with those of the nonreciprocal optical transmission device of FIG. 1.

Figure 4:
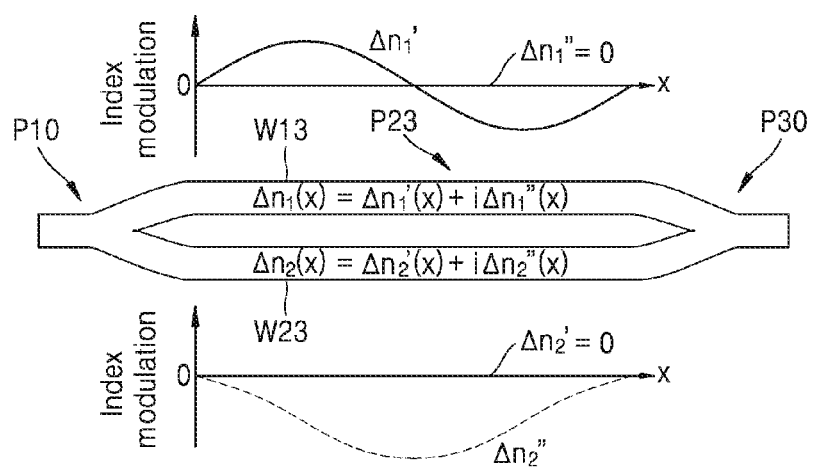
FIG. 4 is a plan view of a nonreciprocal optical transmission device according to another example embodiment.

FIG. 4 is a plan view of a nonreciprocal optical transmission device according to another example embodiment.

In FIG. 4, the real part $n_1'$ of the complex refractive index of a first optical waveguide W13 changes, the imaginary part $n_1''$ of the complex refractive index of the first optical waveguide W13 does not change, the imaginary part $n_2''$ of the complex refractive index of a second optical waveguide W23 changes, and the real part $n_2'$ of the complex refractive index of the second optical waveguide W23 does not change, in an intermediate connecting portion P23. A change in the change amount $\Delta n_1'$ of the real part of the complex refractive index of the first optical waveguide W13 may be equal to or similar to the change in $\Delta n_1'$ of FIG. 2, and a change in the change amount $\Delta n_2''$ of the imaginary part of the complex refractive index of the second optical waveguide W23 may be equal to or similar to the change in $\Delta n_2''$ of FIG. 3.

Figure 5:
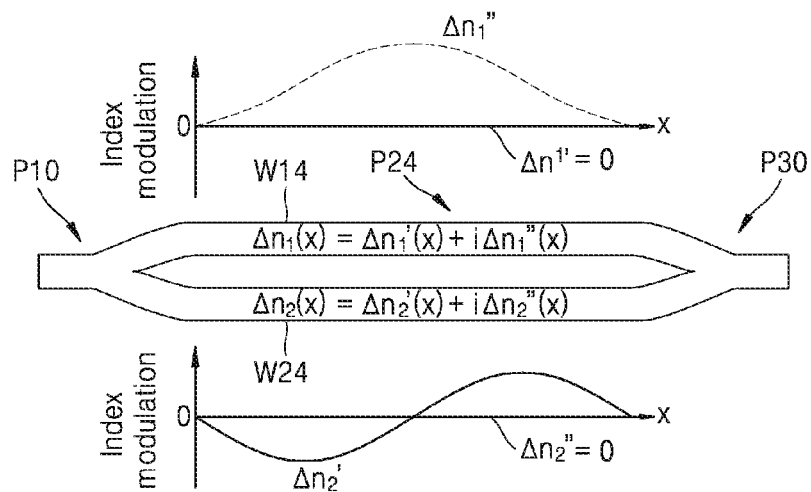
FIG. 5 is a plan view of a nonreciprocal optical transmission device according to another example embodiment.

FIG. 5 is a plan view of a nonreciprocal optical transmission device according to another example embodiment.

In FIG. 5, the imaginary part $n_1''$ of the complex refractive index of a first optical waveguide W14 changes, the real part $n_1'$ of the complex refractive index of the first optical waveguide W14 does not change, the real part $n_2'$ of the complex refractive index of a second optical waveguide W24 changes, and the imaginary part $n_2$" of the complex refractive index of the second optical waveguide W24 does not change, in an intermediate connecting portion P24. A change in the change amount $\Delta n_1$" of the imaginary part of the complex refractive index of the first optical waveguide W14 may be equal to or similar to the change in $\Delta n_1$" of FIG. 2, and a change in the change amount $\Delta n_1$ of the real part of the complex refractive index of the second optical waveguide W24 may be equal to or similar to the change in $\Delta n_2$' of FIG. 3.

Figure 6:
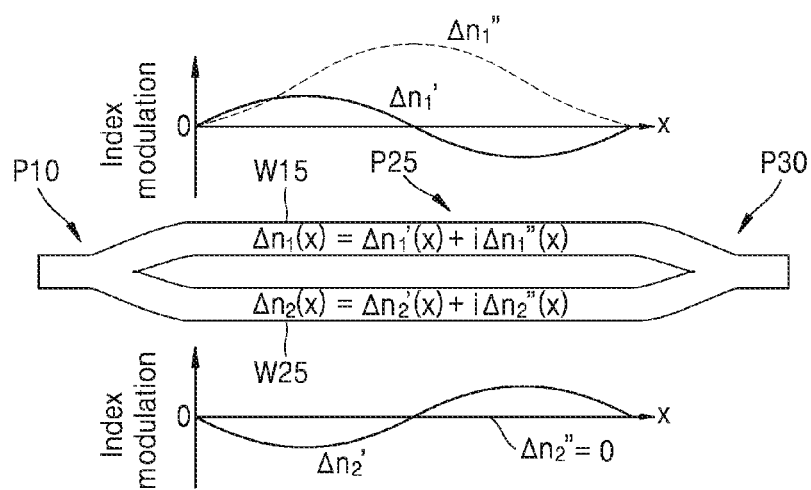
FIG. 6 is a plan view of a nonreciprocal optical transmission device according to another example embodiment.

FIG. 6 is a plan view of a nonreciprocal optical transmission device according to another example embodiment.

In FIG. 6, the real part $n_1$' and the imaginary part $n_1$" of the complex refractive index of a first optical waveguide W15 change, the real part $n_2$' of the complex refractive index of a second optical waveguide W25 changes, and the imaginary part $n_2$" of the complex refractive index of the second optical waveguide W25 does not change, in an intermediate connecting portion P25. The changes of $\Delta n_1$' and $\Delta n_2$' may be equal to or similar with those of FIG. 1, and the change in $\Delta n_1$" may be equal to or similar with that of FIG. 2.

Figure 7:
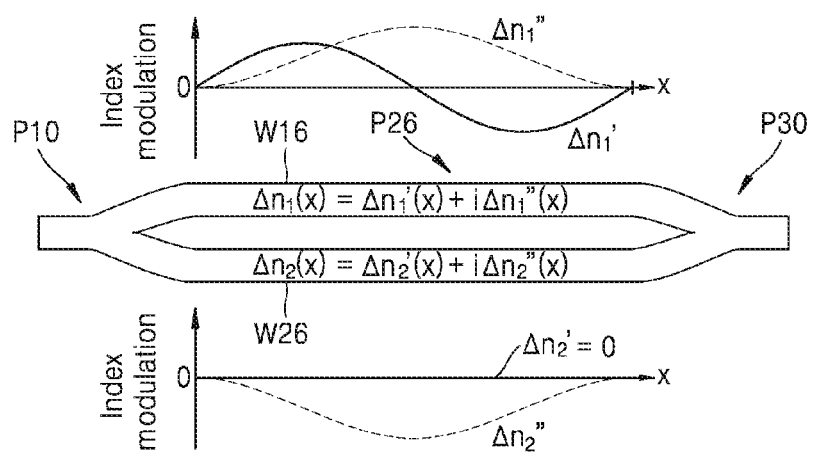
FIG. 7 is a plan view of a nonreciprocal optical transmission device according to another example embodiment.

FIG. 7 is a plan view of a nonreciprocal optical transmission device according to another example embodiment.

In FIG. 7, the real part $n_1$' and the imaginary part $n_1$" of the complex refractive index of a first optical waveguide W16 change, the real part $n_2$' of the complex refractive index of a second optical waveguide W26 does not change, and the imaginary part $n_2$" of the complex refractive index of the second optical waveguide W26 changes, in an intermediate connecting portion P26. The changes of $\Delta n_1$" and $\Delta n_2$" may be equal to or similar with those of FIG. 1, and the change in $\Delta n_1$' may be equal to or similar with that of FIG. 2.

In the example embodiments of FIGS. 4 through 7, the difference between the change amount $\Delta n_1$' of the real part of the complex refractive index of the first optical waveguides W13 through W16 and the change amount $\Delta n_2$' of the real part of the complex refractive index of the second optical waveguides W23 through W26, that is, $\Delta n_1$'−$\Delta n_2$', may increase and then decrease in the direction from the input portion P10 to the output portion P30 and may decrease and then increase in the direction from the output portion P30 to the input portion P10. The difference between the change amount $\Delta n_1$" of the imaginary part of the complex refractive index of the first optical waveguides W13 through w16 and the change amount $\Delta n_2$" of the imaginary part of the complex refractive index of the second optical waveguides W23 through W26, that is, $\Delta n_1$"−$\Delta n_2$", may increase and then decrease in the direction from the input portion P10 to the output portion P30. Thus, the nonreciprocal optical transmission devices of FIGS. 4 through 7 may have optical characteristics that are similar with those of the nonreciprocal optical transmission device of FIG. 1.

In the example embodiment of FIG. 6, the imaginary part $n_2$" of the complex refractive index of the second optical waveguide W25, instead of the imaginary part $n_1$" of the complex refractive index of the first optical waveguide W15, may change. Likewise, in the example embodiment of FIG. 7, the real part $n_2$' of the complex refractive index of the second optical waveguide W26, instead of the real part $n_1$' of the complex refractive index of the first optical waveguide W16, may change. In the example embodiments of FIGS. 1 through 7, the first optical waveguides W10 through W16 may be regarded as second optical waveguides, or the second optical waveguides W20 through W26 may also be regarded as first optical waveguides. In the example embodiments of FIGS. 1 through 7, the graphs showing the changes of $\Delta n_1$', $\Delta n_1$", $\Delta n_2$', and $\Delta n_2$" are examples, and may change variously.

Figure 8A:
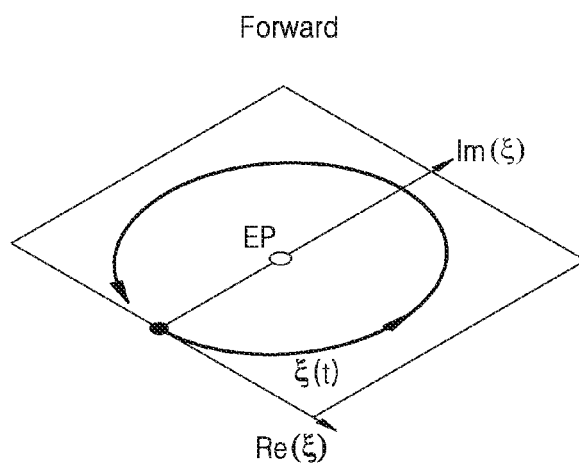
FIGS. 8A and 8B are graphs showing a change in a complex plane of an energy parameter ξ related to a plurality of optical waveguides in a nonreciprocal optical transmission device according to an example embodiment.
Figure 8B:
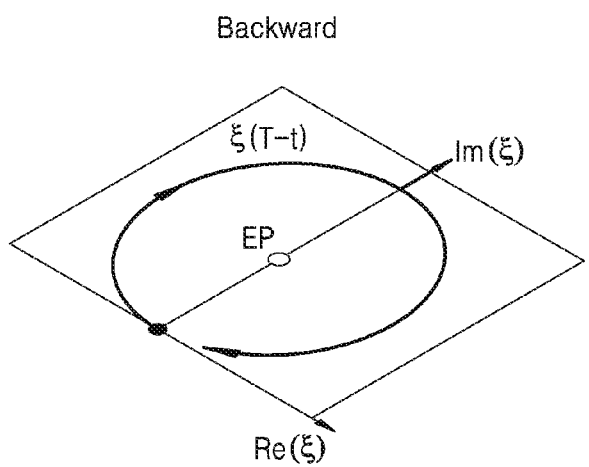

FIGS. 8A and 8B are graphs showing a change in a complex plane of an energy parameter $\xi$ related to a plurality of optical waveguides in a nonreciprocal optical transmission device according to an example embodiment. FIG. 8A shows a change in an energy parameter $\xi$ in a forward direction from an input portion to an output portion, and FIG. 8B shows a change in an energy parameter $\xi$ in a backward direction from the output portion to the input portion. In each graph, Re($\xi$) indicates a real part of the energy parameter $\xi$, Im($\xi$) indicates an imaginary part of the energy parameter and EP indicates an exceptional point of an eigenvalue. Re($\xi$) and Im($\xi$) are related to a complex refractive index, and the eigenvalue is related to the energy parameter $\xi$.

Referring to FIG. 8A, during the travel of light in the forward direction, the energy parameter $\xi$ may change to rotate in a first direction with respect to an exceptional point (EP).

Referring to FIG. 8B, during the travel of light in the backward direction, the energy parameter $\xi$ may change to rotate in a second direction with respect to the EP.

When the energy parameter $\xi$ changes while rotating around the EP, an eigenstate of light changes, such that a phase of light between two waveguides may be switched to an asymmetric mode. However, if the energy parameter $\xi$ changes as shown in FIG. 8A, that is, the real part of the energy parameter $\xi$ has a positive (+) value and the imaginary part thereof has a positive (+) value, an anti-adiabatic state jump phenomenon occurs, such that the eigenstate of light does not change and the phase of light may remain in a symmetric mode. However, the anti-adiabatic state jump phenomenon does not occur during the travel of light in the backward direction, so that the eigenstate of the light changes and the phase of the light is switched to the asymmetric mode during the travel of light in the backward direction.

Although the energy parameter $\xi$ changes according to a circular shape around the EP in FIGS. 8A and 8B, this is an example, and the change in shape may vary. For example, the energy parameter $\xi$ may change according to an oval shape or a polygon shape, as well as a circular shape.

In regard to physical characteristics described with reference to FIGS. 8A and 8B, the nonreciprocal optical transmission device according to an example embodiment may transmit light only in the forward direction and not in the backward direction. However, the physical characteristics described with reference to FIGS. 8A and 8B and a related mechanism are examples and may change.

Figure 9:
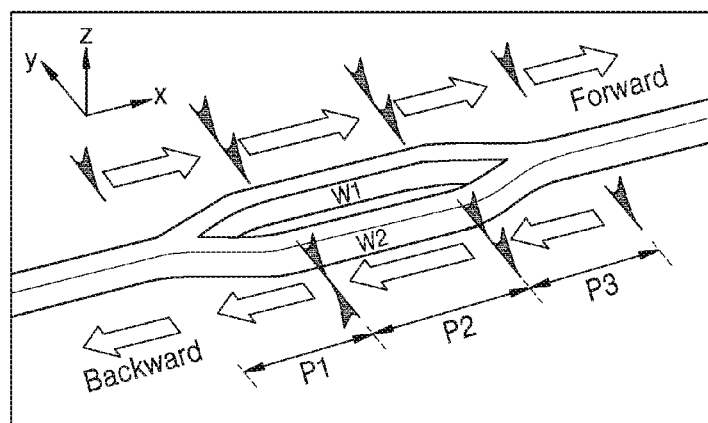
FIG. 9 is a schematic diagram for describing nonreciprocal optical transmission characteristics of a nonreciprocal optical transmission device according to an example embodiment.

FIG. 9 is a schematic diagram for describing nonreciprocal optical transmission characteristics of a nonreciprocal optical transmission device according to an example embodiment.

Referring to FIG. 9, the nonreciprocal optical transmission device may include the input portion P1, the output portion P3, and the intermediate connection portion P2 therebetween, and the intermediate connecting portion P2 may include optical waveguides, e.g., the first optical waveguide W1 and the second optical waveguide W2. The nonreciprocal optical transmission device may correspond to any one of the nonreciprocal optical transmission devices of FIGS. 1 through 7.

When light travels in the forward direction, that is, the light travels from the input portion P1 to the output portion P3, lights split from the input portion P1 are maintained in the symmetric mode in the intermediate connecting portion P2 and then are coupled and output in the output portion P3. On the other hand, when light travels in the backward direction, that is, the light travels from the output portion P3 to the input portion P1, lights split from the output portion P3 are switched to an anti-symmetric mode in the intermediate connecting portion P2 and thus go extinct in the input portion P1. In other words, the light goes outside the optical waveguide of the input portion P1, such that light propagation through the input portion P1 may not be performed. Thus, the light may be transmitted only in the forward direction and may not be transmitted in the backward direction.

Figure 10:
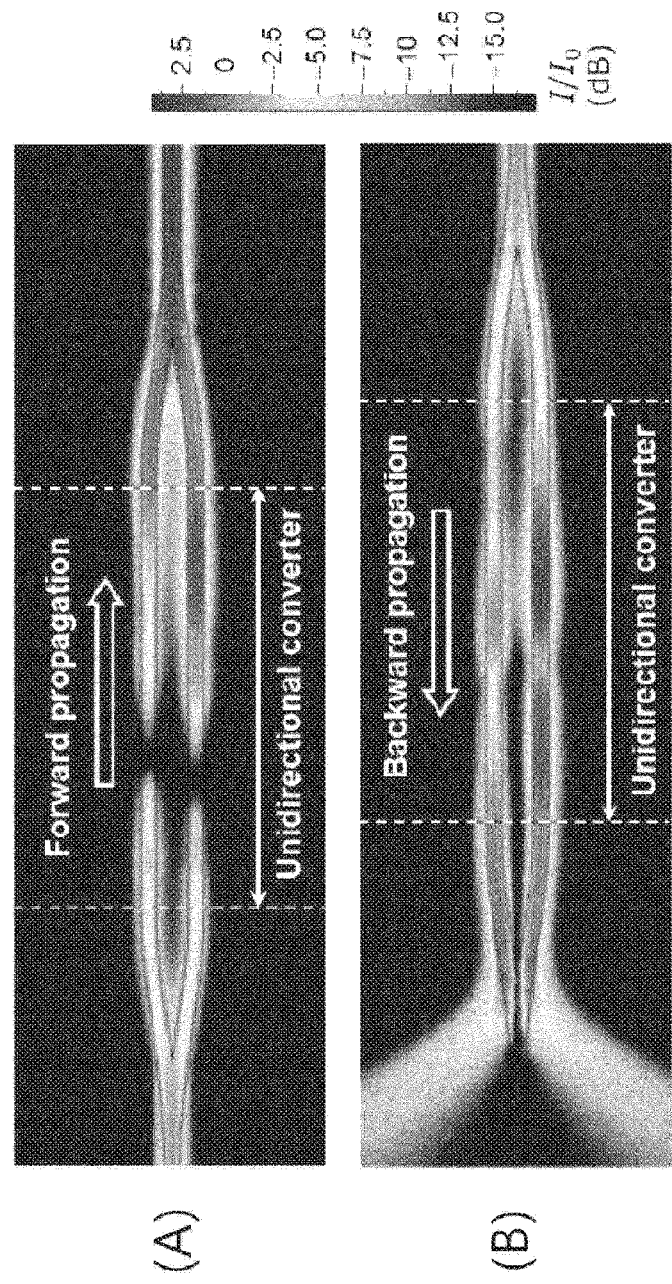
FIG. 10 is a diagram showing a finite element method (FEM) simulation result with respect to a nonreciprocal optical transmission device according to an example embodiment.

FIG. 10 is a diagram showing a finite element method (FEM) simulation result with respect to a nonreciprocal optical transmission device according to an example embodiment. A width of two optical waveguides in an intermediate connecting portion is 1 μm, an a distance between the two optical waveguides is 2 μm, a length of the intermediate connecting portion is 5 mm, a Y-branch length of each of the input portion and the output portion is 300 μm, and a wavelength of used light is 1030 nm. A refractive index of a part of an optical waveguide is 1.55, a variation amplitude of a complex refractive index is 0.0006, and a refractive index of a cladding layer contacting the optical waveguide is 1.5. The complex refractive index of the nonreciprocal optical transmission device is variated as shown in FIG. 1.

Referring to FIG. 10, when light travels in the forward direction as indicated by (A), light output from the output portion has high intensity. This means that the light is transmitted well in the forward direction. On the other hand, when the light travels in the backward direction as indicated by (B), the light is scattered and goes extinct near the input portion and the light does not propagate through the input portion.

As described above, the nonreciprocal optical transmission device according to an example embodiment may control a transmission direction of light by using spatial variation of the complex refractive index of the optical waveguide. In this case, the complex refractive index may gradually change along the extending direction of the optical waveguide.

As in the example embodiments of FIGS. 1 through 7, to change the complex refractive index of the optical waveguides W10 through W16 and W20 through W26 of the intermediate connecting portions P20 through P26, materials or composition ratios of the optical waveguides W10 through W16 and W20 through W26 may gradually change in the longitudinal direction. Using other methods, the physical properties or characteristics of the optical waveguides W10 through W16 and W20 through W26 may gradually change. For example, widths or thicknesses of the optical waveguides W10 through W16 and W20 through W26 may change in the longitudinal direction, or a side patch may be formed in adjacent to the optical waveguides W10 through W16 and W20 through W26, and a distance between the side path and the optical waveguides W10 through W16 and W20 through W26 may be adjusted, thereby changing a complex refractive index (an effective complex refractive index) of the optical waveguides W10 through W16 and W20 through W26. As a volume of the optical waveguide increases, a real part (i.e., an effective real part) of an effective complex refractive index of the optical waveguide may increase. Thus, by changing the width or thickness of the optical waveguide, the real part (i.e., the effective real part) of the effective complex refractive index of the optical waveguide may be adjusted. In addition, as the distance between the optical waveguide and the side patch adjacent thereto decreases, an imaginary part (i.e., an effective imaginary part) of the effective complex refractive index of the optical waveguide may increase. Thus, by changing the distance between the optical waveguide and the side patch adjacent thereto, the imaginary part (i.e., the effective imaginary part) of the effective complex refractive index of the optical waveguide may be adjusted. With reference to FIGS. 11A through 16, a more detailed description will be made of changing the complex refractive index (the effective complex refractive index) of the optical waveguide by changing the width or thickness of the optical waveguide or the distance between the optical waveguide and the side path.

Figure 11A:
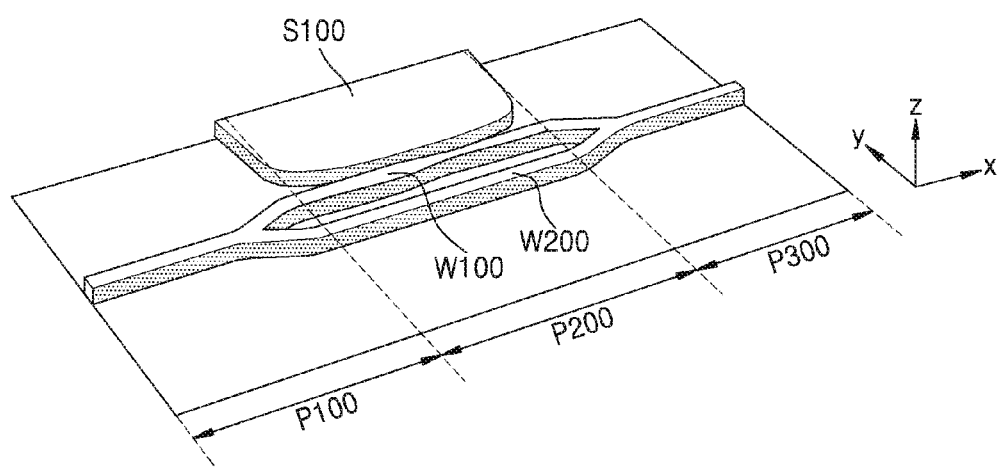
FIG. 11A is a perspective view of a nonreciprocal optical transmission device according to another example embodiment.

FIG. 11A is a perspective view of a nonreciprocal optical transmission device according to another example embodiment.

Referring to FIG. 11A, the nonreciprocal optical transmission device according to the current example embodiment may include an input portion P100, an output portion P300, and an intermediate connecting portion P200 therebetween. The intermediate connecting portion P200 may include optical waveguides, e.g., first and second optical waveguides W100 and W200. Either one or both of the first optical waveguide W100 and the second optical waveguides W200 may undergo width and/or thickness change in a longitudinal direction thereof. Herein, it is illustrated that the width of the first optical waveguide W100 gradually changes between the input portion P100 and the output portion P300. The width of the first optical waveguide W100 may increase and then decrease in a direction from the input portion P100 to the output portion P300 and may decrease and then increase in a direction from the output portion P300 to the input portion P100. In this regard, a change amount of a real part (i.e., an effective real part) of an effective complex refractive index of the first optical waveguide W100 may increase and then decrease in the direction from the input portion P100 to the output portion P300 and may decrease and then increase in the direction from the output portion P300 to the input portion P100.

The nonreciprocal optical transmission device according to the current example embodiment may further include a side patch S100 provided in at least a side of the intermediate connecting portion P200. Herein, one side patch S100 is illustrated as being by the first optical waveguide W100. In this case, a distance between the first optical waveguide W100 and the side patch S100 may change between the input portion P100 and the output portion P300. The distance between the first optical waveguide W100 and the side patch S100 may decrease and then increase in the direction from the input portion P100 to the output portion P300. In this regard, a change amount of an imaginary part (i.e., an effective imaginary part) of an effective complex refractive index of the first optical waveguide W100 may increase and then decrease in the direction from the input portion P100 to the output portion P300.

The width and thickness of the second optical waveguide W200 may be maintained substantially constant between the input portion P100 and the output portion P300. Thus, the real part (e.g., the effective real part) of the effective complex refractive index of the second optical waveguide W200 may be maintained substantially constant between the input portion P100 and the output portion P300. In addition, because the side patch S100 does not affect the second optical waveguide W200 and there is no second side patch adjacent to the second optical waveguide W200, an imaginary part (i.e., an effective imaginary part) of an effective complex refractive index of the second optical waveguide W200 may be maintained substantially constant between the input portion P100 and the output portion P300.

A change in a complex refractive index of the intermediate connecting portion P200 used in the nonreciprocal optical transmission device of FIG. 11A may be equal to or similar with the change in the complex refractive index of the intermediate connecting portion P21 described with reference to FIG. 2. Thus, the nonreciprocal optical transmission device of FIG. 11A may transmit light only in the forward direction, and may not transmit the light in the backward direction.

Figure 11B:
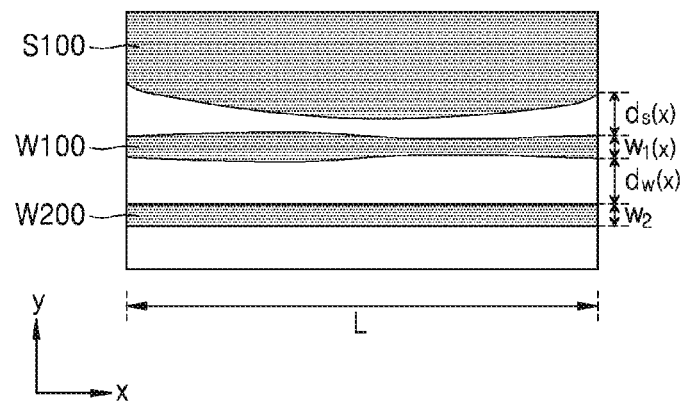
FIG. 11B is a plan view of an intermediate connecting portion of the nonreciprocal optical transmission device of FIG. 11A, viewed from the top.

FIG. 11B is a plan view of an intermediate connecting portion of the nonreciprocal optical transmission device of FIG. 11A, viewed from the top.

Referring to FIG. 11B, a width $w_1$ of the first optical waveguide W100 changes in an x-axis direction and a width $w_2$ of the second optical waveguide W200 is maintained constant. A distance $d_S$ between the first optical waveguide W100 and the side patch S100 may change in the x-axis direction. As the distance $d_S$ decreases, an effective absorption coefficient of the first optical waveguide W100 may increase, such that a change amount of the effective imaginary part of the complex refractive index of the first optical waveguide W10 may increase. A distance $d_W$ between the first optical waveguide W100 and the second optical waveguide W200 may change in the x-axis direction. However, the distance $d_W$ between the first optical waveguide W100 and the second optical waveguide W200 may be large in such a way not to mutually affect their absorption coefficients. Thus, even if the distance $d_W$ changes, the first optical waveguide W100 and the second optical waveguide W200 may not mutually affect their absorption coefficients. A length of the intermediate connecting portion P200 is indicated by L. Depending on the length L, characteristics and performance of the nonreciprocal optical transmission device may change.

For example, if the first optical waveguide W100, the second optical waveguide W200, and the side patch S100 include silicon (Si), their thickness may be about 150 nm, a change range of the width $w_1$ may be about 10 nm, the width $w_2$ may be about 800 nm, a minimum value of $d_S$ may be about 70 nm, and an average value of $d_W$ may be less than or equal to about 300 nm. In another example, if the first optical waveguide W100, the second optical waveguide W200, and the side patch S100 include a dopant-doped poly(methyl methacrylate), that is, doped PMMA, their thickness may be about 400 nm, a change range of the width $w_1$ may be about 100 nm, the width $w_2$ may be about 1.2 μm, a minimum value of $d_S$ may be about 300 nm, and an average value of $d_W$ may be less than or equal to about 1.2 μm. However, materials and related dimensions of the optical waveguides W100 and W200 and the side patch S100 are examples, and may change variously.

Figure 11C:
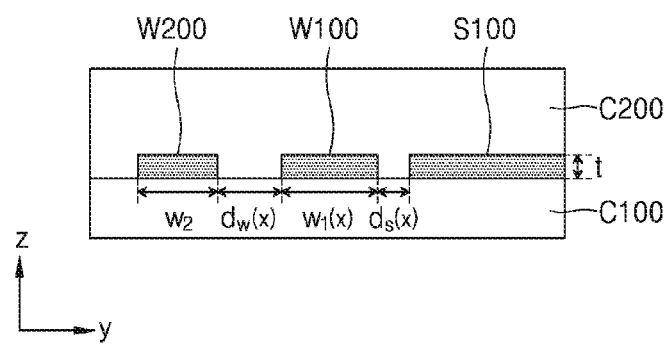
FIG. 11C is a cross-sectional view of the intermediate connecting portion of the nonreciprocal optical transmission device of FIG. 11A.

FIG. 11C is a cross-sectional view of the intermediate connecting portion P200 of the nonreciprocal optical transmission device of FIG. 11A.

Referring to FIG. 11C, the first optical waveguide W100, the second optical waveguide W200, and the side patch S100 may be provided on a first cladding layer C100. On the first cladding layer C100, a second cladding layer C200 may be further provided to cover the first optical waveguide W100, the second optical waveguide W200, and the side patch S100. Thus, the first optical waveguide W100, the second optical waveguide W200, and the side patch S100 may be regarded as being embedded in the cladding layer (C100+C200). The first cladding layer C100 may be an underlayer or a support layer, and the second cladding layer C200 may be an upperlayer or a cover layer. The first cladding layer C100 and the second cladding layer C200 may include materials having lower refractive indices than those of the first optical waveguide W100, the second optical waveguide W200, and the side patch S100. The first cladding layer C100 and the second cladding layer C200 may include an identical material or different materials. The first optical waveguide W100, the second optical waveguide W200, and the side patch S100 may include materials having refractive indices higher than those of the first cladding layer C100 and the second cladding layer C200. The first optical waveguide W100, the second optical waveguide W200, and the side patch S100 may include an identical material or different materials. The thicknesses of the first optical waveguide W100, the second optical waveguide W200, and the side patch S100 are indicated by t. The thickness t may be maintained substantially constant in the longitudinal direction of the first optical waveguide W100 and the second optical waveguide W200, However, according to circumstances, the thickness t of either one or both of the first optical waveguide W100 and the second optical waveguide W200 may change in the longitudinal direction of the first optical waveguide W100 and the second optical waveguide W200.

Figure 11D:
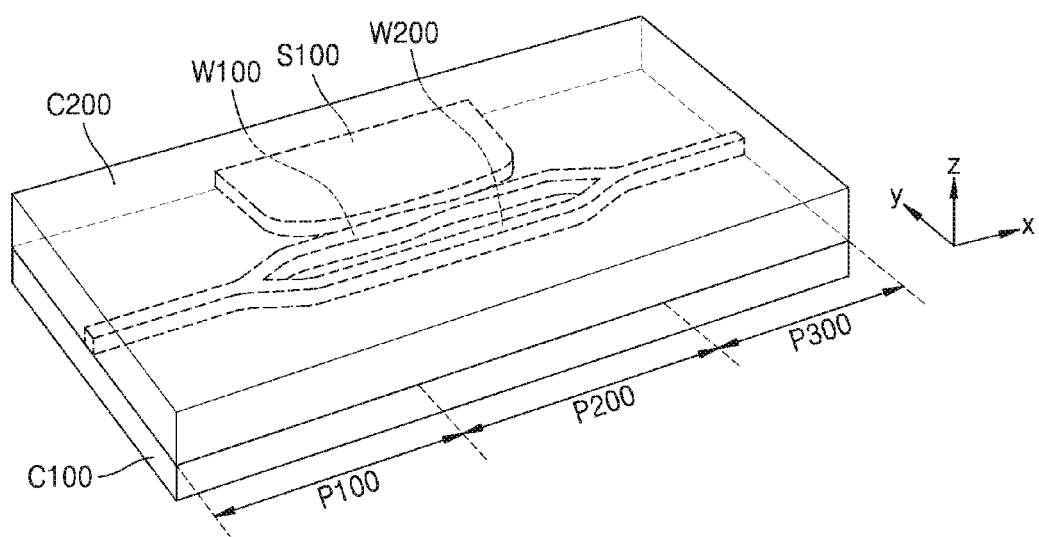
FIG. 11D is a perspective view of a nonreciprocal optical transmission device according to another example embodiment.

FIG. 11D is a perspective view of a nonreciprocal optical transmission device according to another example embodiment.

In FIG. 11D is shown a case in which the structure of FIG. 11A further includes the first cladding layer C100 and the second cladding layer C200 of FIG. 11C. In FIG. 11D, the first cladding layer C100 and the second cladding layer C200 may include a low-refractive-index material, and the first optical waveguide W100, the second optical waveguide W200, and the side patch S100 may include a high-refractive-index material. Herein, the low refractive index and the high refractive index may have relative concepts indicating magnification of the refractive index.

The first optical waveguide W100, the second optical waveguide W200, and the side patch S100 of the nonreciprocal optical transmission device described with reference to FIG. 11D may include, for example, any one or any combination of a semiconductor, a polymer, a dielectric, and metal. The first cladding layer C100 and the second cladding layer C200 may include a dielectric such as a silicon oxide, or a polymer-based material. A width of each of the first optical waveguide W100 and the second optical waveguide W200 may be, for example, about 100 nm-about 100 μm. A width variation rate of the first optical waveguide W100 having a variable width may be, for example, about 10 nm-about 10 μm. A distance between the first optical waveguide W100 and the second optical waveguide W200 may be, for example, about 10 nm-about 10 μm. A distance between the first optical waveguide W100 and the side patch S100 may be, for example, about 1 nm-about 10 μm. A length of the intermediate connecting portion P200 may be, for example, about 1 μm-about 15 mm. An entire length of the nonreciprocal optical transmission device may be less than or equal to about 20 mm, for example. A thickness of the first optical waveguide W100, the second optical waveguide W200, and the side patch S100 may be, for example, about 5 nm-about 2 μm. The materials and related dimensions of the nonreciprocal optical transmission device may be applied to example embodiments of FIGS. 13 through 16 described later.

Figure 12:
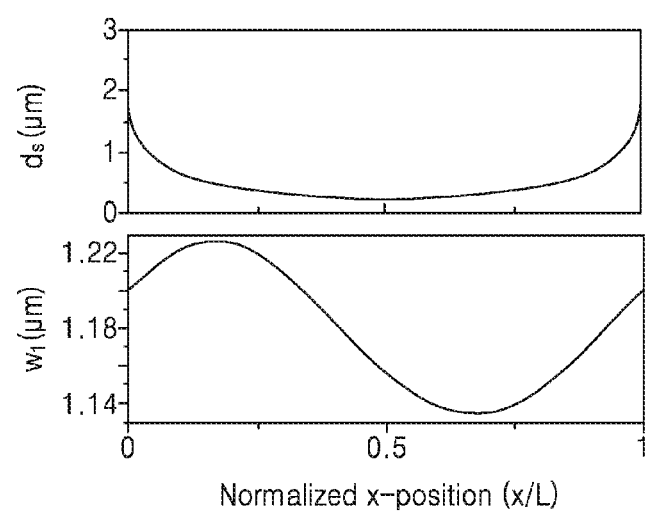
FIG. 12 is a graph showing a change profile of a width of a first optical waveguide and a change profile of a distance between the first optical waveguide and a side patch in the nonreciprocal optical transmission device described with reference to FIGS. 11A through 11D.

FIG. 12 is a graph showing a change profile of the width $w_1$ of the first optical waveguide W100 and a change profile of the distance $d_S$ between the first optical waveguide W100 and the side patch S100 in the nonreciprocal optical transmission device described with reference to FIGS. 11A through 11D.

Referring to FIG. 12, $w_1$ increases and then decreases, and again increases in the x-axis direction. $d_S$ may decrease and then increase in the x-axis direction. However, the change profile of $w_1$ and the change profile of $d_S$ shown in FIG. 12 are examples, and their change ranges and change tendencies may vary.

The change in the complex refractive index of the nonreciprocal optical transmission device described with reference to FIGS. 11A through 11D and 12 may be the same as or similar with that shown in FIG. 2. The change in the complex refractive index of the nonreciprocal optical transmission device to be described with reference to FIG. 13 may be the same as or similar with that shown in FIG. 1.

Figure 13:
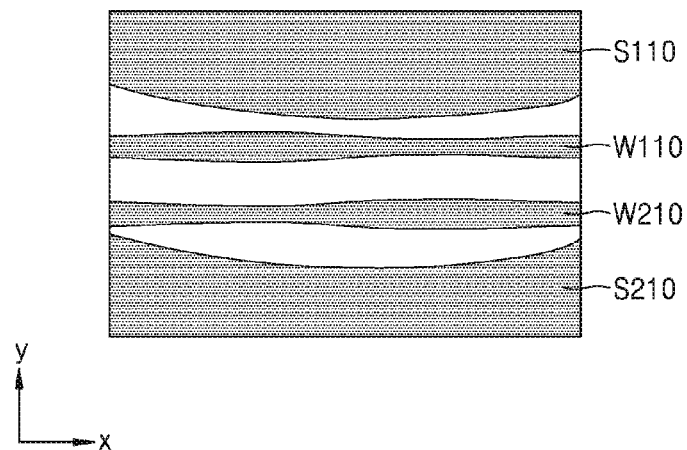
FIG. 13 is a plan view of an intermediate connecting portion of a nonreciprocal optical transmission device according to another example embodiment.

FIG. 13 is a plan view of an intermediate connecting portion of a nonreciprocal optical transmission device according to another example embodiment.

Referring to FIG. 13, either one or both of a first optical waveguide W110 and a second optical waveguides W210 may undergo width and/or thickness change in a longitudinal direction thereof. Herein, the widths of both the first optical waveguide W110 and the second optical waveguide W210 change. The width of the first optical waveguide W110 may increase and then decrease in a direction from an input portion to an output portion and may decrease and then increase in a direction from the output portion to the input portion. The width of the second optical waveguide W210 may decrease and then increase in the direction from the input portion to the output portion, and may increase and then decrease in the direction from the output portion to the input portion. A distance between the first optical waveguide W110 and a first side patch S110 may decrease and then increase in the direction from the input portion to the output portion. A distance between the second optical waveguide W210 and a second side patch S210 may increase and then decrease in the direction from the input portion to the output portion. In this case, the change in the complex refractive index of the nonreciprocal optical transmission device may be the same as or similar with that shown in FIG. 1.

In FIG. 11B, a change in the width of the first optical waveguide W100 may be about twice greater than that of the first optical waveguide W110 of FIG. 13. In FIG. 11B, a change in the distance between the first optical waveguide W100 and the side patch S100 may be about twice greater than that between the first optical waveguide W110 and the first side patch S110 in FIG. 13. For convenience, the first optical waveguides W100 and W110 are illustrated as being identical to each other and the side patches S100 and S110 are illustrated as being identical to each other in FIGS. 11B and 13, but their changes may be different between the two example embodiments. The width of one W100 of the two optical waveguides W100 and W200 changes and one side patch S100 is used in FIG. 11B, whereas in FIG. 13, the widths of both of the two optical waveguides W110 and W210 change and the two side patches S110 and S210 are used, such that the change amount of the width of the optical waveguide W100 of FIG. 11B may be distributed to the first optical waveguide W110 and the second optical waveguide W210 of FIG. 13, and an effect (an effect of the change in the complex index of refraction) due to the side patch S100 of FIG. 11B may also be distributed to the first side patch S110 and the second side patch S210 of FIG. 13. If the width of only one W100 of the two optical waveguides W100 and W200 changes and one side patch S100 is used, a structure may be simplified and designing and manufacturing may be facilitated.

Figure 14:
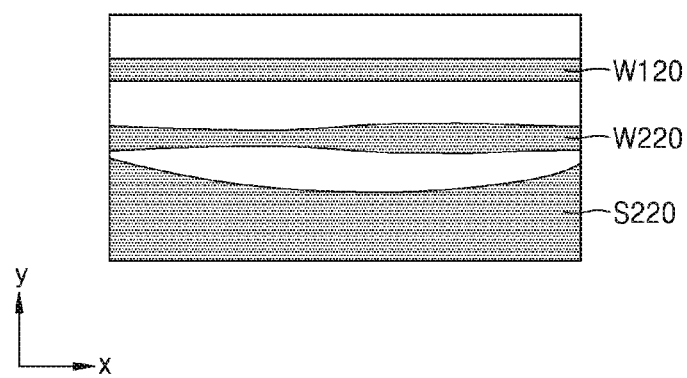
FIG. 14 is a plan view of an intermediate connecting portion of a nonreciprocal optical transmission device according to another example embodiment.
Figure 15:
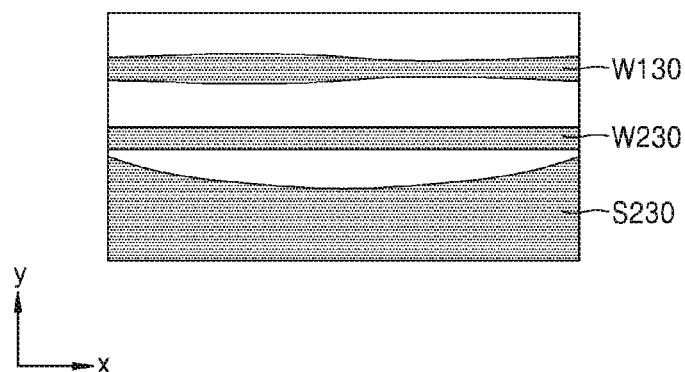
FIG. 15 is a plan view of an intermediate connecting portion of a nonreciprocal optical transmission device according to another example embodiment.
Figure 16:
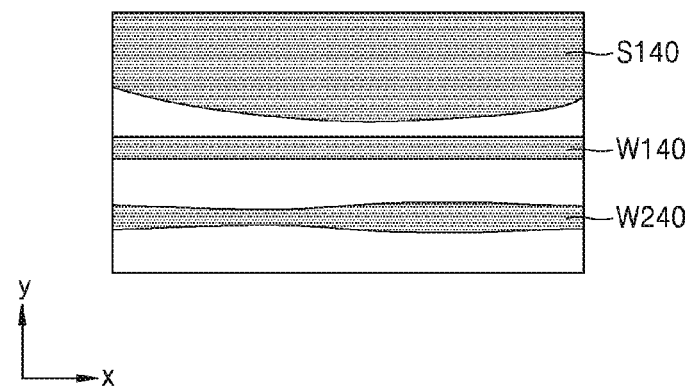
FIG. 16 is a plan view of an intermediate connecting portion of a nonreciprocal optical transmission device according to another example embodiment.

FIGS. 14, 15, and 16 are plan views of intermediate connecting portions of nonreciprocal optical transmission devices according to other example embodiments. These drawings show an intermediate connecting portion applicable to each nonreciprocal optical transmission device.

A change in a complex refractive index of an intermediate connecting portion shown in FIG. 14 may correspond to the change in the complex refractive index shown in FIG. 3. A width of a first optical waveguide W120 may be maintained constant, and a width of a second optical waveguide W220 may change between an input portion and an output portion. For example, the width of the second optical waveguide W220 may decrease and then increase in a direction from the input portion to the output portion and may increase and then decrease in a direction from the output portion to the input portion. A side patch S220 may be in a side of the second optical waveguide W220, and a distance between the second optical waveguide W220 and the side patch S220 may increase and then decrease in the direction from the input portion to the output portion.

A change in a complex refractive index of an intermediate connecting portion shown in FIG. 15 may correspond to the change in the complex refractive index shown in FIG. 4. A width of a first optical waveguide W130 changes in a longitudinal direction and a width of a second optical waveguide W230 may be maintained constant. A side patch S230 may be in a side of the second optical waveguide W230, and a distance between the second optical waveguide W230 and the side patch S230 may increase and then decrease in the direction from the input portion to the output portion.

A change in a complex refractive index of an intermediate connecting portion shown in FIG. 16 may correspond to the change in the complex refractive index shown in FIG. 5. A width of a first optical waveguide W140 may be maintained constant, and a width of a second optical waveguide W240 may change in the longitudinal direction. A side patch S140 may be in a side of the first optical waveguide W140, and a distance between the first optical waveguide W140 and the side patch S140 may decrease and then increase in the direction from the input portion to the output portion.

The nonreciprocal optical transmission device including the intermediate connecting portion corresponding to the change in the complex refractive index shown in FIGS. 6 and 7 may be designed. For example, if the second side patch S210 is excluded and an effect thereof is integrated into the first side patch S110 in FIG. 13, a change in the complex refractive index as shown in FIG. 6 may be seen. If the width of the second optical waveguide W210 is maintained constant and an effect of a change in the width of the second optical waveguide W210 is integrated into the first optical waveguide W110, a change in the complex refractive index as shown in FIG. 7 may be seen. In addition, various forms of nonreciprocal optical transmission devices may be designed to reflect various forms of the change in the complex refractive index modified from FIGS. 1 through 7.

Figure 17:
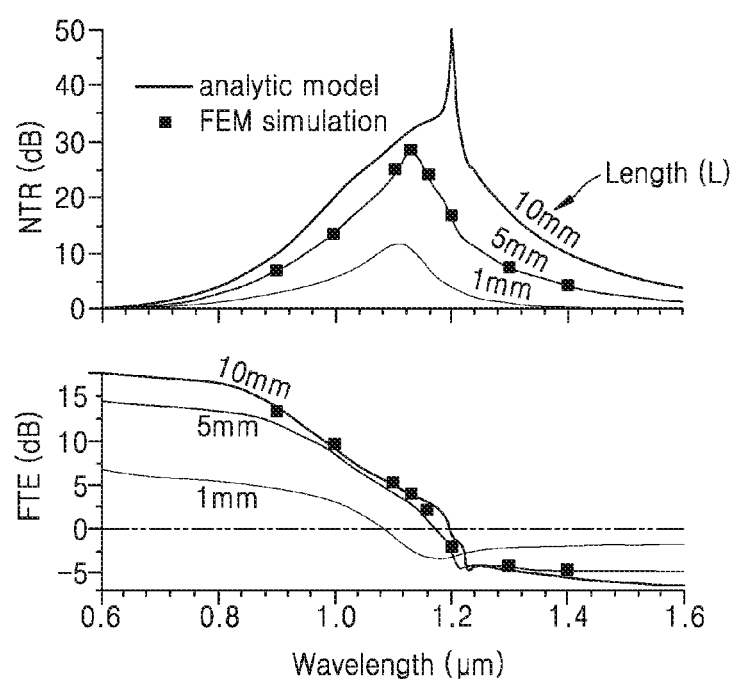
FIG. 17 is a graph showing a measurement result of performance of a nonreciprocal optical transmission device according to an example embodiment.

FIG. 17 is a graph showing a measurement result of performance of a nonreciprocal optical transmission device according to an example embodiment. FIG. 17 includes a result of analytic calculation (model) and a result of finite element method (FEM) simulation with respect to a nonreciprocal transmission ratio (NTR) and a forward transmission efficiency (FTE). The results shown in FIG. 17 regard to three cases in which the length L of the intermediate connecting portion P200 in the device structured as shown in FIG. 11D is 1 mm, 5 mm, and 10 mm. The FEM simulation has been performed with respect to the device having the length L of 5 mm.

Referring to an upper graph in FIG. 17, a relatively high NTR (dB) may be seen in a wavelength region. As the wavelength increases, the NTR (dB) increase and then decreases. As the length L of the device (intermediate connecting portion) increases, the NTR (dB) increases.

Referring to a lower graph of FIG. 17, a change tendency of an FTE (dB) with respect to a wavelength may be seen. A change tendency of the FTE (dB) with respect to the length L of the device (intermediate connecting portion) may also be seen. Herein, the FTE (dB) is a log scale. Thus, the FTE (dB) of 0 (zero) means that an efficiency in a scale is 1 (out/in ratio), that is, 100%.

The following Table 1 is obtained from the results of FIG. 17, and shows main characteristic parameters of the nonreciprocal optical transmission device according to an example embodiment.

TABLE 1

| L | $[NTR]_{max}$ | $\lambda_{max}$ | $\Delta\lambda_{10\text{-}dB}$ | $\Delta v_{10\text{-}dB}$ | $<FTE>_{avg}$ |
|---|---|---|---|---|---|
| 1 mm | 11.9 dB | 1.11 μm | 62 nm | 15.2 THz | 0.977 |
| 5 mm | 27.8 dB | 1.13 μm | 305 nm | 76.5 THz | 1.081 |
| 10 mm | 34.8 dB | 1.18 μm | 500 nm | 119.0 THz | 1.072 |

In Table 1, $[NTR]_{max}$ indicates a maximum value of NTR. If the length L is about 10 mm, a maximum value of the NTR is set, excluding a spike peak in FIG. 17. $<FTE>_{avg}$ indicates an average value of the FTE in a scale (rate). Thus, when $<FTE>_{avg}$ is 1, it means that the efficiency is 100%.

In Table 1, $\lambda_{max}$ indicates a wavelength corresponding to the maximum value of the NTR, that is, [NTR]max. $\Delta\lambda_{10\text{-}dB}$ indicates a wavelength width of a region where the NTR is greater than or equal to 10 dB in the NTR (dB) graph of FIG. 17. $\Delta v_{10\text{-}dB}$ is a frequency value into which $\Delta\lambda_{10\text{-}dB}$ (wavelength) is converted. $\Delta v_{10\text{-}dB}$ is a frequency value indicating a transmission bandwidth of a nonreciprocal optical transmission device.

According to an example embodiment, a nonreciprocal optical transmission device having a high NTR, a high FTE, and a wide transmission bandwidth may be implemented. The NTR may be greater than or equal to about 20 dB or about 30 dB, and the bandwidth (10 dB bandwidth) may be greater than or equal to about 70 THz or about 100 THz. In the bandwidth, the average FTE may be about 1, such that the nonreciprocal optical transmission device according to an example embodiment may be used (almost) without signal loss. The nonreciprocal optical transmission device according to an example embodiment may be a chip-integration type device. Thus, the nonreciprocal optical transmission device may be easily manufactured on a chip or may be integrated, together with other optical elements (optical devices), in one chip. This may be meaningful in terms of ease of manufacturing and implementation of an optical chip.

A conventional optical isolator adopts Faraday rotation occurring in a single-crystal magneto-optic medium such as yttrium-iron-garnet (YIG) crystals, etc. However, for the single-crystal magneto-optic medium, a thin film deposition technique has not yet been established, and thus the single-crystal magneto-optic medium may not be used in implementation of a chip-integration type device. In addition, a length of a device based on the single-crystal magneto-optical medium is about 5 cm to about 10 cm, and a cross-sectional area of the device is about several $cm^2$, such that the device is difficult to insert into high-integration optical apparatus and system. In relation to performance such as the NTR, the FTE, the bandwidth, etc., there is a limitation in implementation of excellent performance.

In addition to the device based on the single-crystal magneto-optic medium, there are an Si waveguide resonator device to which a poly-crystal magneto-optic medium thin film is applied, a waveguide diffraction grating device using indirect interband photonic transition, a nonlinear asymmetric waveguide/photonic crystal resonator device, etc., but all of these techniques have narrow bandwidths of about 100 GHz or less and low FTEs, and in some cases, a high-power light source may have to be used, making it difficult to implement devices at practical levels. The Si waveguide resonator device to which the poly-crystal magneto-optic medium thin film is applied has a narrow bandwidth (<2 GHz) and a low FTE (~1%). The waveguide diffraction grating device using indirect interband photonic transition has a low NTR (<3 dB), and a high-power (equivalent to 0.1 W) ultra-high-frequency acoustic wave or electro-optic traveling wave generator in a 10 GHz band also has to be integrated together with the waveguide device. The nonlinear asymmetric waveguide/photonic crystal resonator device has a narrow bandwidth (<100 GHz) and a low FTE (<10%), and operates only for a high-power optical signal.

However, the nonreciprocal optical transmission device according to an example embodiment of the present disclosure may be easily manufactured on a chip, while easily guaranteeing excellent performance such as a high NTR, a high FTE, a wide bandwidth, and so forth. For example, an FTE of about 90% or higher and a bandwidth of about 100 THz or wider may be implemented, and a low-power operation may be possible. The nonreciprocal optical transmission device according to an example embodiment uses variation of a complex refractive index without depending on a resonance cavity or a beat phenomenon, thus implementing a very wide bandwidth (about 100 THz or wider). Thus, the nonreciprocal optical transmission device according to an example embodiment may be used in an optical integrated circuit device for next-generation 10 THz or 100 THz-class ultra wideband/ultra high-density digital information processing. Various nonreciprocal optical devices proposed conventionally have limitations and problems such as narrow band characteristics, a low forward transmission efficiency, a need for a non-realistic ultra-high-frequency acoustic wave generator, operability only for high-power optical waves, impossibility of integration, and so forth. The nonreciprocal optical transmission device according to an example embodiment may overcome such limitations and problems, thus being applied to implementation of next-generation digital optical information processing apparatuses and systems.

In the above-described example embodiments, a description and illustrations have been made mainly of a case in which two optical waveguides are applied to the intermediate connecting portion of the nonreciprocal optical transmission device, but in some cases, two or more optical waveguides may be applied to the intermediate connecting portion. Such examples are shown in FIG. 18.

Figure 18:
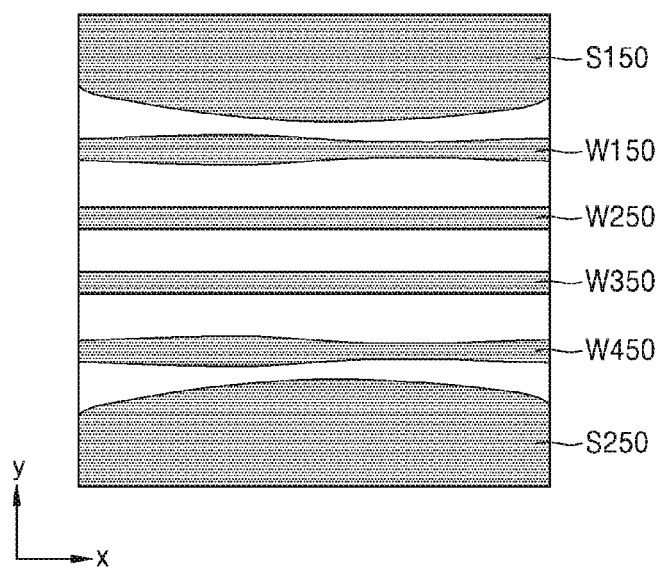
FIG. 18 is a plan view of an intermediate connecting portion of a nonreciprocal optical transmission device according to another example embodiment.

FIG. 18 is a plan view of an intermediate connecting portion of a nonreciprocal optical transmission device according to another example embodiment.

Referring to FIG. 18, an intermediate connecting portion may include a first optical waveguide W150, a second optical waveguide W250, a third optical waveguide W350, and a fourth optical waveguide W450. A width of any one or any combination of the first through fourth optical waveguides W150 through W450 may change in the direction from the input portion to the output portion. Herein, the widths of the first optical waveguide W150 and the fourth optical waveguide W450 change. Widths of the second optical waveguide W250 and the third optical waveguide W350 may be maintained constant, without substantially (globally) changing. A first side patch S150 may be further provided in a side of the first optical waveguide W150. A second side patch S250 may be further provided in a side of the fourth optical waveguide W450. A distance between the first optical waveguide W150 and the first side patch S150 may change between the input portion and the output portion. A distance between the fourth optical waveguide W450 and a second side patch S250 may change between the input portion and the output portion. Structures of the first optical waveguide W150, the second optical waveguide W250, and the first side patch S150 may be similar with those of the first optical waveguide W100, the second optical waveguide W200, and the side patch S100 of FIG. 11B. Structures of the third optical waveguide W350, the fourth optical waveguide W450, and the second side patch S250 may be symmetric to those of the first optical waveguide W150, the second optical waveguide W250, and the side patch S150. However, forms of the first through fourth optical waveguides W150 through W450 described in FIG. 18 and forms of the first side patch S150 and the second side patch S250 are examples, and may change variously. For example, based on the example embodiments of FIGS. 13 through 16, the structure of FIG. 18 may be modified variously. In a side of each of the plurality of optical waveguides W150 through W450, an input portion connected to them may be provided, and in the other side of each of the plurality of optical waveguides W150 through W450, an output portion connected to them may be provided. Each of the input portion and the output portion may include four branches. The number of optical waveguides included in an intermediate connecting portion may be equal to 3 or greater than or equal to 5. In some cases, a side patch may be provided between a plurality of optical waveguides.

While a description has been made mainly of a case in which the width of the optical waveguide changes and the distance between the optical waveguide and the side patch is adjusted in FIGS. 11A through 18, the thickness of the optical waveguide instead of the width of the optical waveguide may change. In this case, the change tendency of the thickness of the optical waveguide in the longitudinal direction may be similar with that of the width. In some cases, both the width and the thickness of the optical waveguide may change together. Also, the width/thickness change (i.e., volume change) of the optical waveguide and the adjustment of the distance between the optical waveguide and the side patch may not be used together. In other words, when the width/thickness of the optical waveguide changes in the longitudinal direction, an effect of the side patch may be implemented in other ways, without using the side patch. Moreover, when at least one side patch is used, an effect of the width/thickness change in the optical waveguide may be implemented in other ways, without changing the width/thickness of the optical waveguide.

The nonreciprocal optical transmission device according to the example embodiments described above may be applied to optical devices in various fields.

Figure 19:
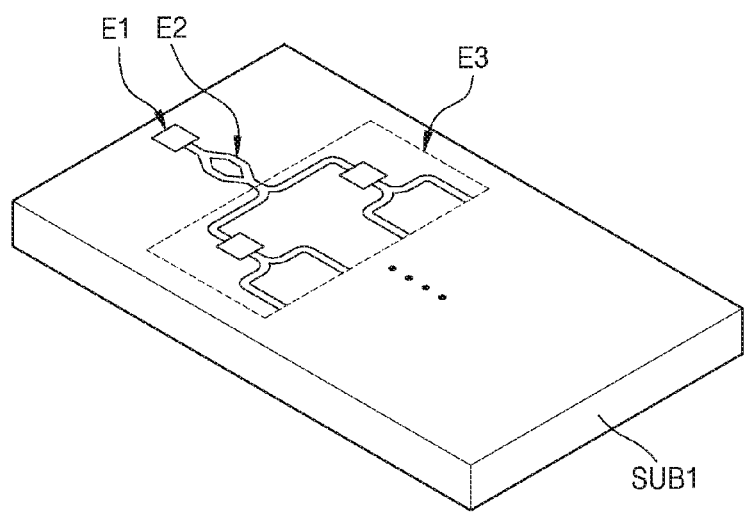
FIG. 19 is a perspective view of an optical apparatus to which a nonreciprocal optical transmission device is applied, according to an example embodiment.

FIG. 19 is a perspective view of an optical apparatus to which a nonreciprocal optical transmission device is applied, according to an example embodiment.

Referring to FIG. 19, a nonreciprocal optical transmission element E2 according to an example embodiment is provided on a substrate SUB1. The nonreciprocal optical transmission element E2 may correspond to the nonreciprocal optical transmission devices that have been described with reference to FIGS. 1 through 18. The nonreciprocal optical transmission element E2 may be a sort of optical isolator. An input terminal connecting optical element E1 for inputting light to an input portion of the nonreciprocal optical transmission element E2 may be provided. An output terminal connecting optical element E3 for receiving light output from an output portion of the nonreciprocal optical transmission element E2 may be further provided. The input terminal connecting optical element E1 and the output terminal connecting optical element E3 may be provided, together with the nonreciprocal optical transmission element E2, on the identical substrate SUB1. The input terminal connecting optical element E1 may include, for example, a light source. The light source may be a laser source or other light sources. The output terminal connecting optical element E3 may include a waveguide and an optical component. At least one other optical element connected to the output terminal connecting optical element E3 may be further provided on the substrate SUB1.

Figure 20:
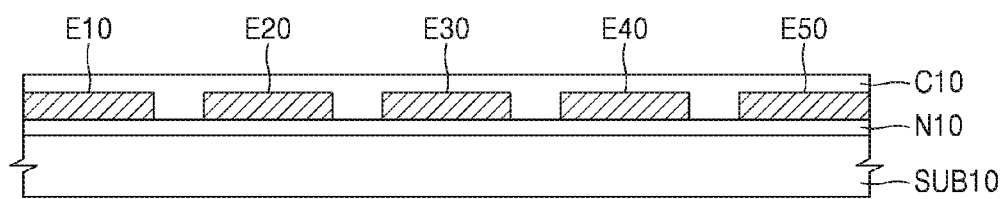
FIG. 20 is a cross-sectional view of a beam steering device to which a nonreciprocal optical transmission device is applied, according to an example embodiment.

For example, a nonreciprocal optical transmission device (element) according to example embodiments may be applied to a light detection and ranging (LiDAR) apparatus. In FIG. 20, a nonreciprocal optical transmission device (element) according to an example embodiment is applied to a beam steering device of the LiDAR apparatus.

FIG. 20 is a cross-sectional view of a beam steering device to which a nonreciprocal optical transmission device is applied, according to an example embodiment.

Referring to FIG. 20, the beam steering device may include an input optical element E10 and an output optical element E50 provided on a substrate SUB10. The input optical element E10 may be a light source or an input coupler that receives light from an external light source. The output optical element E50 may be an emitter that emits light. The output optical element E50 may be a sort of output coupler. The beam steering device may further include a nonreciprocal optical transmission element E20, an optical splitter E30, and an optical modulator E40 between the input optical element E10 and the output optical element E50. The nonreciprocal optical transmission element E20 may correspond to the nonreciprocal optical transmission devices that have been described with reference to FIGS. 1 through 18. The optical splitter E30 splits light delivered from the nonreciprocal optical transmission element E20 into a plurality of lights. The optical modulator E40 modulates the plurality of split lights. A direction of light (i.e., an emitted light) emitted from the output optical element E50 may be controlled by the modulation of the light in the optical modulator E40.

An insulating layer N10 is optionally provided on a substrate SUB10, and the input optical element E10, the nonreciprocal optical transmission element E20, the optical splitter E30, the optical modulator E40, and the output optical element E50 may be provided on the insulating layer N10. For convenience, the input optical element E10, the nonreciprocal optical transmission element E20, the optical splitter E30, the optical modulator E40, and the output optical element E50 are illustrated as simple structures. Optical waveguide(s) may be provided between two adjacent elements, i.e., between the input optical element E10 and the nonreciprocal optical transmission element E20, between the nonreciprocal optical transmission element E20 and the optical splitter E30, between the optical splitter E30 and the optical modulator E40, and between the optical modulator E40 and the output optical element E50.

On the substrate SUB10, a cover layer C10 may be further provided to cover the input optical element E10, the nonreciprocal optical transmission element E20, the optical splitter E30, the optical modulator E40, and the output optical element E50. The cover layer C10 may include a low-index material having a low refractive index. For example, the cover layer C10 may include a dielectric such as a silicon oxide, or a polymer-based material. The cover layer C10 may also serve as a sort of protective layer. However, in some cases, the cover layer C10 may not be used.

Any one or any combination of the input optical element E10, the nonreciprocal optical transmission element E20, the optical splitter E30, the optical modulator E40, and the output optical element E50 may include any one or any combination of a semiconductor, a polymer, a dielectric, and metal. For example, any one or any combination of the input optical element E10, the nonreciprocal optical transmission element E20, the optical splitter E30, the optical modulator E40, and the output optical element E50 may include any one or any combination of an IV-group material (e.g., Si, Ge, etc.), a compound including an IV-group material (e.g., SiGe, etc.), an III-V-group compound, an oxide, a nitride, and a polymer. In some cases, at least two of the input optical element E10, the nonreciprocal optical transmission element E20, the optical splitter E30, the optical modulator E40, and the output optical element E50 may include different materials. If the substrate SUB10 includes silicon Si or any one or any combination of the input optical element E10, the nonreciprocal optical transmission element E20, the optical splitter E30, the optical modulator E40, and the output optical element E50 includes Si, the beam steering device according to the current example embodiment may be implemented/manufactured using a technique in the field of "silicon photonics." The silicon photonics technique may be used for ease of processing because the silicon photonics technique may be used (i.e., compatible) with complementary metal oxide semiconductor (CMOS) processing.

Figure 21:
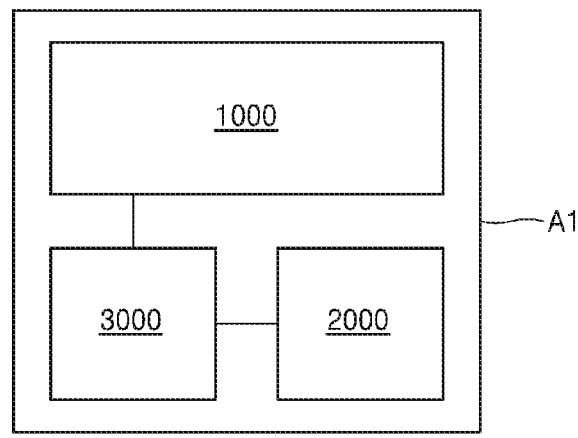
FIG. 21 is a block diagram of an overall system of an optical apparatus including a beam steering device to which a nonreciprocal optical transmission device is applied, according to an example embodiment.

FIG. 21 is a block diagram of an overall system of an optical apparatus A1 including a beam steering device to which a nonreciprocal optical transmission device is applied, according to an example embodiment. An optical apparatus A1 may be a LiDAR apparatus.

Referring to FIG. 21, the optical apparatus A1 may include a beam steering device 1000. The beam steering device 1000 may include a nonreciprocal optical transmission device according to an example embodiment, and for example, may have a device structure described with reference to FIG. 20. The optical apparatus A1 may include a light source in the beam steering device 1000 or may include a light source provided separately from the beam steering device 1000. The optical apparatus A1 may include a detector 2000 that detects light that is steered by the beam steering device 1000 and then reflected by an object. The detector 2000 may include an optical receiver. The detector 2000 may further include a filter or other optical members. The optical apparatus A1 may further include a circuit 3000 connected to either one or both of the beam steering device 1000 and the detector 2000. The circuit 3000 may include a calculator (processor) that obtains and calculates data, and may further include a driver, a controller, and so forth. The circuit 3000 may further include a power source, a memory, and so forth.

Although the optical apparatus A1 is illustrated as including the beam steering device 1000 and the detector 2000 in one apparatus in FIG. 21, the beam steering device 1000 and the detector 2000 may be separately provided in separate apparatuses, instead of being provided in one apparatus. The circuit 3000 may be connected to the beam steering device 1000 or the detector 2000 through wireless communication, instead of wired communication. The structure shown in FIG. 21 may change variously.

An optical apparatus according to an example embodiment may be a LiDAR apparatus. The LiDAR apparatus may be of a time-of-flight (TOF) or phase-shift type. The LiDAR apparatus may be applied to an autonomous vehicle, a flying object like a drone, etc., a mobile device, a small walking means (e.g., a bicycle, a motorcycle, a stroller, a board, etc.), robots, assisting means for humans/animals (e.g., a cane, a helmet, an ornament, a watch, a bag, etc.), an Internet of things (IoT) apparatus/system, a security apparatus/system, and so forth. The beam steering device and the optical apparatus including the same according to an example embodiment may be applied to an apparatus for obtaining a three-dimensional (3D) image, a 3D camera, etc. In addition, the beam steering device and the optical apparatus including the same according to an example embodiment may be applied to various optical and electronic device fields for various purposes. The nonreciprocal optical transmission device according to an example embodiment is applicable to other various optical apparatuses as well as the beam steering device or the LiDAR apparatus. For example, the nonreciprocal optical transmission device may be applied to various health care apparatuses including a mobile health care apparatus.

Figure 22:
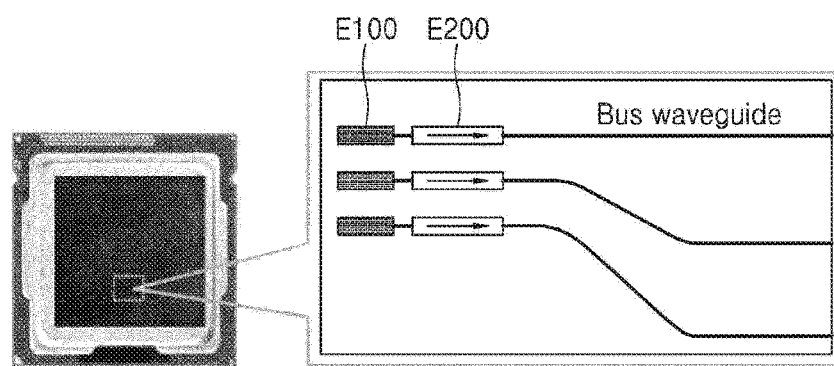
FIG. 22 is a diagram showing an integrated optical processor to which a nonreciprocal optical transmission device is applied, according to an example embodiment.

FIG. 22 is a diagram showing an integrated optical processor to which a nonreciprocal optical transmission device is applied, according to an example embodiment.

Referring to FIG. 22, an integrated optical processor may include a nonreciprocal optical transmission device E200 according to an example embodiment. The nonreciprocal optical transmission device E200 may be a sort of on-chip optical isolator. A light source E100 for inputting light to the nonreciprocal optical transmission device E200 may be provided. A bus waveguide extending from the nonreciprocal optical transmission device E200 may be provided.

The nonreciprocal optical transmission device according to an example embodiment may be applied to any optical device based on a nonlinear effect as well as an apparatus using a laser light source. Optical devices based on the non-linear effect may include an optical logical operation device, a wavelength conversion device, an optical amplifier, an optical buffer, a high-order harmonic generation device, and so forth. The nonreciprocal optical transmission device according to an example embodiment may be applied to an optical diode, an optical circulator, etc., as well as an optical isolator.

Hereinbelow, a brief description will be made of a method of manufacturing a nonreciprocal optical transmission device according to an example embodiment.

The nonreciprocal optical transmission device according to an example embodiment may be manufactured on various substrates. For example, the nonreciprocal optical transmission device may be manufactured on a semiconductor substrate, an insulating substrate, or a conductive substrate. If the semiconductor substrate is used, a general semiconductor substrate, a semiconductor-on-insulator (SOI) substrate, a semiconductor-on-glass (SOG) substrate, etc., may be used. After an amorphous semiconductor layer (e.g., an Si layer) is formed (is grown) on a substrate, a nonreciprocal optical transmission device may be manufactured from the amorphous semiconductor layer. For example, the method of manufacturing the nonreciprocal optical transmission device using the SOI substrate may be as shown in FIGS. 23A through 23D.

FIGS. 23A, 23B, 23C, and 23D are cross-sectional views showing a method of manufacturing a nonreciprocal optical transmission device according to an example embodiment.

Figure 23A:
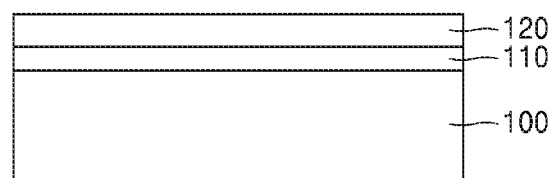
FIGS. 23A, 23B, 23C, and 23D are cross-sectional views showing a method of manufacturing a nonreciprocal optical transmission device according to an example embodiment.

Referring to FIG. 23A, an insulating layer 110 may be provided on a first substrate 100, and a semiconductor layer 120 may be provided on the insulating layer 110. The first substrate 100 may be a semiconductor substrate. The first substrate 100, the insulating layer 110, and the semiconductor layer 120 may form one SOI substrate. The insulating layer 110 may be a dielectric or a polymer. The semiconductor layer 120 may include any one or any combination of various semiconductors such as Si, Ge, SiGe, etc.

Figure 23B:
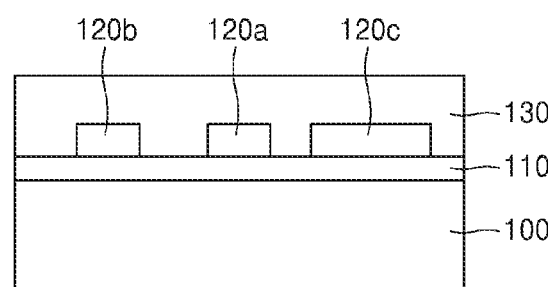

Referring to FIG. 23B, a plurality of optical waveguides 120a and 120b may be formed from the semiconductor layer 120 by patterning the semiconductor layer 120. For example, the first optical waveguide 120a and the second optical waveguide 120b may be formed. When patterning is performed, at least one side patch 120c may be further formed from the semiconductor layer 120. The first optical waveguide 120a, the second optical waveguide 120b, and the side patch 120c may correspond to the first optical waveguide W100, the second optical waveguide W200, and the side patch S100 described with reference to FIG. 11A. On the insulating layer 110, a cladding layer 130 may be formed to cover the first optical waveguide 120a, the second optical waveguide 120b, and the side patch 120c. The cladding layer 130 may be formed of a dielectric or a polymer.

Figure 23C:
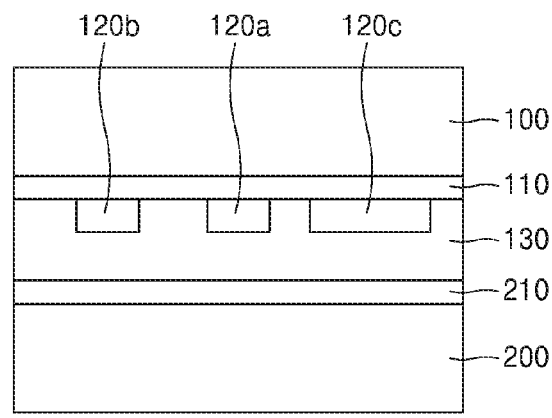

Referring to FIG. 23C, the first substrate 100 on which the cladding layer 130 is formed may be bonded to a second substrate 200. One surface of the cladding layer 130 may be bonded to one surface of the second substrate 200. Thus, the cladding layer 130 may be provided between the first substrate 100 and the second substrate 200. A bonding layer 210 may be provided between the second substrate 200 and the cladding layer 130. The bonding layer 210 may include a polymer, metal, etc. In some cases, the bonding layer 210 may not be used.

Figure 23D:
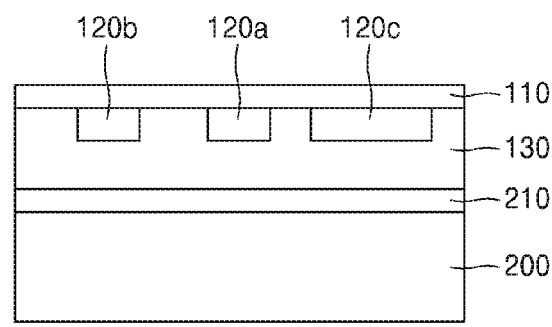

Next, the first substrate 100 may be removed/separated from a structure (a deposited structure) shown in FIG. 23C. A resultant is shown in FIG. 23D. Referring to FIG. 23D, the cladding layer 130 may be provided on the second substrate 200, and the first optical waveguide W100, the second optical waveguide W200, and the side patch S100 may be provided in the cladding layer 130. On the cladding layer 130, an insulating layer 110 may be provided to cover the first optical waveguide W100, the second optical waveguide W200, and the side patch S100. The insulating layer 110 may be an upper cladding layer.

The method of manufacturing the nonreciprocal optical transmission device described with reference to FIGS. 23A through 23D is an example, and may change variously. The method may change variously according to a material of a substrate, a material of an optical waveguide, and so forth. A transfer process as performed in FIGS. 23A through 23D may not be used. When the nonreciprocal optical transmission device is manufactured, at least one optical element optically connected thereto may be further formed to manufacture various optical apparatuses.

While various details have been described above, they may be interpreted as providing examples of the example embodiments rather than limiting the scope of the example embodiments. For example, those of ordinary skill in the art may recognize that the detailed structure of the nonreciprocal optical transmission device that have been described with reference to FIGS. 1 through 18 may change variously. The structures of the optical apparatus described with reference to FIGS. 19 through 22 may also change variously. In addition, an application field and an application scheme of the nonreciprocal optical transmission device and the optical apparatus may change variously. Therefore, the scope of the example embodiments may be defined by the technical spirit of the claims rather than by the described example embodiments.

It may be understood that the example embodiments described herein may be considered in a descriptive sense only and not for purposes of limitation. Descriptions of features or aspects within each of the example embodiments may be considered as available for other similar features or aspects in other example embodiments.

While the example embodiments have been described with reference to the figures, it will be understood by those of ordinary skill in the art that various changes in form and details may be made therein without departing from the spirit and scope as defined by the following claims.

What is claimed is:

1. A nonreciprocal optical transmission device comprising:
   an optical input portion;
   an optical output portion; and
   an intermediate connecting portion interposed between the optical input portion and the optical output portion, and comprising a first optical waveguide and a second optical waveguide,
   a first side patch disposed opposite the second optical waveguide with respect to the first optical waveguide,
   wherein either one or both of a width and a thickness of one of the first optical waveguide and the second optical waveguide changes in a direction from the optical input portion to the optical output portion, and
   wherein both of a width and a thickness of another one of the first optical waveguide and the second optical waveguide is maintained constant between the optical input portion to the optical output portion.

2. The nonreciprocal optical transmission device of claim 1, wherein either one or both of a width and a thickness of the first optical waveguide changes in the direction from the optical input portion to the optical output portion, and
   wherein either one or both of a width and a thickness of the second optical waveguide changes in the direction from the optical input portion to the optical output portion.

3. The nonreciprocal optical transmission device of claim 1, further comprising a second side patch disposed opposite the first optical waveguide with respect to the second optical waveguide,
   wherein a distance between the second side patch and the second optical waveguide decreases and then increases in the direction from the optical input portion to the optical output portion, or increases and then decreases in the direction from the optical input portion to the optical output portion.

4. The nonreciprocal optical transmission device of claim 3, wherein the intermediate connecting portion further comprises a third optical waveguide and a fourth optical waveguide disposed between the first optical waveguide and the second optical waveguide.

5. The nonreciprocal optical transmission device of claim 4,
wherein both of a width and a thickness of both of the third optical waveguide and the fourth optical waveguide is maintained constant between the optical input portion to the optical output portion.

6. The nonreciprocal optical transmission device of claim 1, further comprising:
a first cladding layer, the first optical waveguide, the second optical waveguide, and the first side patch are provided on the first cladding layer; and
a second cladding layer provided to cover the first optical waveguide, the second optical waveguide, and the first side patch,
wherein the first cladding layer and the second cladding layer include materials having lower refractive indices than those of the first optical waveguide, the second optical waveguide, and the first side patch.

7. The nonreciprocal optical transmission device of claim 1, wherein a complex refractive index of the first optical waveguide changes between the optical input portion and the optical output portion.

8. The nonreciprocal optical transmission device of claim 7, wherein a change profile of a real part of the complex refractive index of the first optical waveguide in the direction from the optical input portion to the optical output portion is asymmetric with respect to a center of the intermediate connecting portion.

9. The nonreciprocal optical transmission device of claim 1, wherein a complex refractive index of the second optical waveguide changes between the optical input portion and the optical output portion.

10. The nonreciprocal optical transmission device of claim 9, wherein a change profile of a real part of the complex refractive index of the second optical waveguide in the direction from the optical input portion to the optical output portion is asymmetric with respect to a center of the intermediate connecting portion.

11. The nonreciprocal optical transmission device of claim 1, wherein a distance between the first side patch and the first optical waveguide decreases and then increases in the direction from the optical input portion to the optical output portion, or increases and then decreases in the direction from the optical input portion to the optical output portion.

12. A nonreciprocal optical transmission device comprising:
an optical input portion;
an optical output portion; and
an intermediate connecting portion interposed between the optical input portion and the optical output portion, and comprising a first optical waveguide and a second optical waveguide,
a side patch disposed opposite the second optical waveguide with respect to the first optical waveguide,
wherein a distance between the side patch and the first optical waveguide changes in a direction from the optical input portion to the optical output portion within a range of 10 nm to 10 μm, and
wherein a width of the first optical waveguide changes within a range of 100 nm, and a width of the second optical waveguide is maintained.

13. The nonreciprocal optical transmission device of claim 12, wherein, when the first optical waveguide, the second optical waveguide, and the side patch include silicon (Si), a minimum value of the distance is 70 nm.

14. The nonreciprocal optical transmission device of claim 13, wherein the width of the first optical waveguide:
increases and then decreases in the direction from the optical input portion to the optical output portion, and decreases and then increases in a direction from the optical output portion to the optical input portion; or
decreases and then increases in the direction from the optical input portion to the optical output portion, and increases and then decreases in the direction from the optical output portion to the optical input portion.

15. The nonreciprocal optical transmission device of claim 14, wherein the width of the second optical waveguide is maintained at 800 nm.

16. The nonreciprocal optical transmission device of claim 12, wherein, when the first optical waveguide, the second optical waveguide, and the side patch include doped PMMA, a minimum value of the distance is 300 nm.

17. The nonreciprocal optical transmission device of claim 16, wherein the width of the first optical waveguide:
increases and then decreases in the direction from the optical input portion to the optical output portion, and decreases and then increases in a direction from the optical output portion to the optical input portion; or
decreases and then increases in the direction from the optical input portion to the optical output portion, and increases and then decreases in the direction from the optical output portion to the optical input portion.

18. The nonreciprocal optical transmission device of claim 17, wherein the width of the second optical waveguide is maintained at 1.2 μm.

19. The nonreciprocal optical transmission device of claim 12, further comprising:
a first cladding layer, the first optical waveguide, the second optical waveguide, and the side patch are provided on the first cladding layer; and
a second cladding layer provided to cover the first optical waveguide, the second optical waveguide, and the side patch,
wherein the first cladding layer and the second cladding layer include materials having lower refractive indices than those of the first optical waveguide, the second optical waveguide, and the side patch.

* * * * *